United States Patent
Park

(10) Patent No.: US 10,606,406 B2
(45) Date of Patent: Mar. 31, 2020

(54) ELECTRONIC DEVICE AND OPERATION METHOD THEREOF

(71) Applicant: Samsung Electronics Co., Ltd., Suwon-si, Gyeonggi-do (KR)

(72) Inventor: Sung-Chul Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 395 days.

(21) Appl. No.: 14/659,973

(22) Filed: Mar. 17, 2015

(65) Prior Publication Data

US 2015/0268742 A1 Sep. 24, 2015

(30) Foreign Application Priority Data

Mar. 18, 2014 (KR) .................. 10-2014-0031340

(51) Int. Cl.
| | | |
|---|---|---|
| G06F 3/041 | (2006.01) | |
| G06F 3/0354 | (2013.01) | |
| H04W 4/80 | (2018.01) | |
| H04B 5/00 | (2006.01) | |
| G06F 3/0488 | (2013.01) | |
| G06F 3/0487 | (2013.01) | |
| G06F 3/044 | (2006.01) | |
| G06F 3/0481 | (2013.01) | |
| G06F 3/0482 | (2013.01) | |
| H04B 7/06 | (2006.01) | |

(52) U.S. Cl.
CPC ...... *G06F 3/04162* (2019.05); *G06F 3/03545* (2013.01); *G06F 3/044* (2013.01); *G06F 3/0481* (2013.01); *G06F 3/0482* (2013.01); *G06F 3/0487* (2013.01); *G06F 3/0488* (2013.01); *H04B 5/0031* (2013.01); *H04W 4/80* (2018.02); *H04B 7/0602* (2013.01)

(58) Field of Classification Search
CPC .... G06F 3/03545; G06F 3/038; G06F 3/0383; G06F 3/0484; G06F 3/0487; G06F 3/0488; G09G 2203/04101
See application file for complete search history.

(56) References Cited

U.S. PATENT DOCUMENTS

| | | | | |
|---|---|---|---|---|
| 6,563,494 | B1 * | 5/2003 | Eichstaedt | G06F 3/03545 345/179 |
| 9,008,579 | B2 * | 4/2015 | Mayer | H04W 4/02 370/338 |
| 9,265,074 | B2 * | 2/2016 | Liu | H04W 76/10 |
| 9,716,531 | B2 * | 7/2017 | Zhao | G06F 3/0488 |
| 10,033,773 | B2 * | 7/2018 | Kim | H04L 65/403 |
| 2003/0122774 | A1 * | 7/2003 | Harada | G06F 3/0481 345/156 |
| 2005/0171714 | A1 * | 8/2005 | Ely | G06F 1/3203 702/75 |
| 2005/0283482 | A1 * | 12/2005 | Lai | G06F 3/03545 |
| 2006/0192772 | A1 * | 8/2006 | Kambayashi | G06F 3/03545 345/179 |

(Continued)

*Primary Examiner* — Patrick F Marinelli
(74) *Attorney, Agent, or Firm* — Jefferson IP Law, LLP

(57) ABSTRACT

An electronic device is provided. The electronic device includes a first antenna part configured to exchange a first wireless signal with a coordinate sensing sensor of a second electronic device by electromagnetic induction, and a second antenna part configured to exchange a second wireless signal with a data communication antenna of the second electronic device by electromagnetic induction.

7 Claims, 28 Drawing Sheets

(56) References Cited

U.S. PATENT DOCUMENTS

| | | | |
|---|---|---|---|
| 2006/0227121 A1* | 10/2006 | Oliver | G06F 3/03545 345/179 |
| 2006/0262106 A1* | 11/2006 | Suk | G06F 1/1626 345/179 |
| 2007/0124503 A1* | 5/2007 | Ramos | G06F 3/017 709/248 |
| 2008/0147911 A1* | 6/2008 | Hitt | G06F 17/30218 710/33 |
| 2010/0110021 A1* | 5/2010 | Chiu | G06F 3/0416 345/173 |
| 2011/0081923 A1* | 4/2011 | Forutanpour | H04W 4/21 455/457 |
| 2012/0068975 A1* | 3/2012 | Wei | G06F 3/046 345/179 |
| 2012/0100803 A1* | 4/2012 | Suumaki | H04W 36/0072 455/41.1 |
| 2012/0139879 A1 | 6/2012 | Kim et al. | |
| 2012/0169400 A1* | 7/2012 | Liu | G06F 3/0416 327/517 |
| 2012/0282859 A1* | 11/2012 | Mayer | H04W 4/02 455/41.2 |
| 2012/0324293 A1* | 12/2012 | Grube | H04L 67/1097 714/41 |
| 2013/0091238 A1* | 4/2013 | Liu | H04W 76/10 709/217 |
| 2013/0106725 A1* | 5/2013 | Bakken | G06F 3/033 345/173 |
| 2013/0203346 A1* | 8/2013 | Han | H04M 1/7253 455/41.1 |
| 2013/0203353 A1* | 8/2013 | Kim | H04B 7/24 455/41.2 |
| 2013/0238744 A1* | 9/2013 | Paschke | G06F 9/543 709/216 |
| 2014/0002413 A1* | 1/2014 | Kim | G06F 3/0416 345/174 |
| 2014/0092069 A1* | 4/2014 | Bentov | G06F 1/26 345/179 |
| 2014/0148098 A1* | 5/2014 | Song | H04W 36/14 455/41.1 |
| 2014/0176371 A1* | 6/2014 | Liao | G06F 1/1626 343/702 |
| 2014/0176372 A1* | 6/2014 | Liao | H01Q 1/526 343/702 |
| 2014/0233052 A1* | 8/2014 | Meike | G06F 3/1219 358/1.13 |
| 2014/0256250 A1* | 9/2014 | Cueto | H04B 5/0031 455/41.1 |
| 2014/0292720 A1* | 10/2014 | Liang | H04L 67/06 345/174 |
| 2014/0375262 A1* | 12/2014 | Yamaguchi | H02J 50/90 320/108 |
| 2015/0002453 A1* | 1/2015 | Lu | G06F 3/0416 345/174 |
| 2015/0022504 A1* | 1/2015 | Pyun | G06F 3/03545 345/179 |
| 2015/0062459 A1* | 3/2015 | Li | H01Q 1/44 349/12 |
| 2015/0092663 A1* | 4/2015 | Cho | H04W 76/14 370/315 |
| 2015/0268742 A1* | 9/2015 | Park | G06F 3/03545 345/179 |
| 2016/0112096 A1* | 4/2016 | Zhao | G06F 3/0488 455/41.1 |

* cited by examiner

ELECTRONIC DEVICE AND OPERATION METHOD THEREOF

CROSS-REFERENCE TO RELATED APPLICATION(S)

This application claims the benefit under 35 U.S.C. § 119(a) of a Korean patent application filed on Mar. 18, 2014 in the Korean Intellectual Property Office and assigned Serial No. 10-2014-0031340, the entire disclosure of which is hereby incorporated by reference.

TECHNICAL FIELD

The present disclosure relates to an electronic device using electromagnetic induction and an operation thereof.

BACKGROUND

At present, owing to the growth of electronic communication industries, user devices (e.g., electronic devices such as smartphones, cellular phones, electronic schedulers, personal complex terminals, laptop computers, and the like) are becoming necessities to modern society and becoming significant means for delivery of fast changing information. Such user devices provide a graphical user interface (GUI) environment using a touch screen, as well as a variety of multimedia based on a web environment.

Also, the user device may be operatively coupled to, or a variety of electronic components may be mounted to a user device so as to provide a variety of functions. For example, a stylus providing a function of writing or drawing may be mounted to a user device. As another example, a stereo speaker module may be mounted to the user device to provide stereo sound when using a music function of the device. A communication module (e.g., a near field communication (NFC) module) providing functions of communication with other electronic devices through a network may also be mounted to a user device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure of the present disclosure is to provide an electronic device for extending a user interface function with an electronic pen.

Another aspect of the present disclosure is to provide an electronic device for performing short-range wireless communication (e.g., near field communication (NFC)) with an electronic pen.

In accordance with an aspect of the present disclosure, a first electronic device is provided. The electronic device includes a first antenna part for exchanging a first wireless signal with a coordinate sensing sensor of a second electronic device by electromagnetic induction, and a second antenna part for exchanging a second wireless signal with a data communication antenna of the second electronic device by electromagnetic induction.

In accordance with another aspect of the present disclosure, a second electronic device is provided. The electronic device includes a screen, and a data communication antenna for exchanging a first wireless signal with a first electronic device by electromagnetically inducing the first electronic device arranged in front of the screen.

In accordance with another aspect of the present disclosure, an operation method of an electronic device is provided. The method includes obtaining connection information of a counterpart electronic device from an electronic pen, and connecting a communication with the counterpart electronic device using the connection information, and exchanging data with the counterpart electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
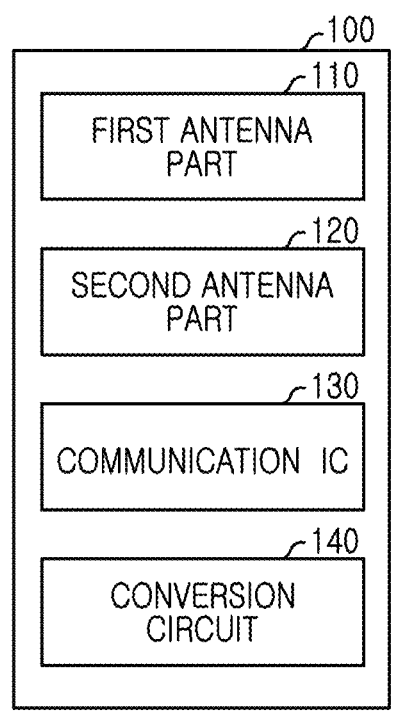
FIG. 1 illustrates a block diagram of an electronic pen according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions "include", "may include," etc. as used in the present disclosure indicate the existence of disclosed corresponding functions, operations, constituent elements or the like, and do not limit other functions, operations, constituent elements or the like. Also, it should be understood that the terms "include", "have," etc. as used in the present disclosure are to designate the existence of features stated in the specification, numerals, operations, constituent elements, components, or a combination thereof, and are not to exclude the possibility of existence or addition of one or more other features, numerals, operations, constituent elements, components, or combinations thereof.

The expressions such as "or," etc. as used in the present disclosure include any and all combinations of words enumerated together. For example, "A or B" may include A, may include B, or may include both of A and B.

The expressions such as "first", "second", etc. as used in the present disclosure may modify various constituent elements of present disclosure, but do not intend to limit the corresponding constituent elements. For example, the expressions do not limit the order and/or importance and the like of the corresponding constituent elements. The expressions may be used to distinguish one constituent element from another constituent element. For example, all of a first user device and a second user device are user devices, and represent different user devices. For example, a first constituent element may be named as a second constituent element without departing from the scope of right of the present disclosure. Likely, even a second constituent element may be named as a first constituent element.

When it is mentioned that any constituent element is "connected to" or "accesses" another constituent element, the any constituent element may be directly connected or accessed to the other constituent element, but it should be understood that new other constituent element may also exist between the any constituent element and the other constituent element. In contrast, when it is mentioned that any constituent element is "directly connected to" or "directly accesses" to another constituent element, it should be understood that no new other constituent element exists between the any constituent element and the other constituent element.

The terms used in the present disclosure are used for describing various embodiments, and do not intend to limit the present disclosure. The expression of a singular number includes the expression of a plural number unless the context clearly dictates otherwise.

Unless defined otherwise, all the terms used herein including the technological or scientific terms have the same meaning as commonly understood by a person having ordinary knowledge in the art to which the present disclosure belongs. The terms as defined in a general dictionary should be interpreted as having the same meanings as the contextual meanings of a related technology, and are not interpreted as having ideal or excessively formal meanings unless defined clearly in the present disclosure.

An electronic device according to the present disclosure may be a device including a telecommunication function. For example, the electronic device may include at least one of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MPEG Audio Layer 3 (MP3) player, a mobile medical instrument, a camera, or a wearable device (e.g., a Head Mounted Display (HMD) such as electronic glasses, electronic clothes, an electronic bracelet, an electronic necklace, an appcessory (i.e., a smartphone accessory that is combined with a specially written application to perform a function), an electronic tattoo, or a smart watch).

According to various embodiments, the electronic device may be a smart home appliance having a telecommunication function. The smart home appliance may include, for example, at least one of a television, a Digital Video Disc (DVD) player, an audio system, a refrigerator, an air conditioner, a cleaner, an oven, a microwave, a washing machine, an air cleaner, a set-top box, a TV box (for example, Samsung HomeSync™, Apple TV™, or Google TV™), a game console, an electronic dictionary, an electronic locking system, a camcorder, or an electronic frame.

According to various embodiments, the electronic device may include at least one of various medical instruments (e.g., Magnetic Resonance Angiography (MRA), Magnetic Resonance Imaging (MRI), Computerized Tomography (CT), a moving-camera, an ultrasonic machine and the like), a navigation device, a Global Positioning System (GPS) receiver, an Event Data Recorder (EDR), a Flight Data Recorder (FDR), a car infotainment device, an electronic equipment for ship (e.g., a navigation device for ship, a gyrocompass and the like), avionics, a security instrument, or an industrial or home robot.

According to various embodiments, the electronic device may include at least one of a part of furniture or building/structure including a telecommunication function, an electronic board, an electronic signature receiving device, a projector, or various metering instruments to measure a variety of things (e.g., tap water, electricity, gas, radio wave metering instrument or the like). The electronic device according to the present disclosure may be one of the aforementioned various devices or a combination of two or more of them. Also, it is obvious to those skilled in the art that the electronic device according to the present disclosure is not limited to the aforementioned instruments.

Below, an electronic device according to various embodiments will be described with reference to the accompanying drawings. The term 'user' used in the various embodiments may denote a person who uses the electronic device or a device (e.g., an artificial intelligent electronic device) which uses the electronic device.

FIG. 1 illustrates a block diagram of an electronic pen according to an embodiment of the present disclosure.

Referring to FIG. 1, the electronic pen (or a stylus) 100 may include a first antenna part 110, a second antenna part 120, a communication Integrated Circuit (IC) 130, or a conversion circuit 140.

The first antenna part 110 may be set to operate at a first frequency. The first antenna part 110 (e.g., an electromagnetic induction antenna) may be, for example, induced (i.e., electromagnetically induced) by a magnetic field of at least one radiator (e.g., a digitizer panel or an antenna) of an electronic device, generate electric current and accumulate the generated electric current. Also, the first antenna part 110 may form a first magnetic field (i.e., a wireless signal or a radio wave signal) using the accumulated electric current. The first antenna part 110 may include a resonance circuit including a coil, a condenser or the like not shown.

The second antenna part 120 may be set to operate at a second frequency. The second antenna part 120 (e.g., an electromagnetic induction antenna) may be, for example, induced (i.e., electromagnetically induced) by a magnetic field of at least one radiator (e.g., the digitizer panel or the antenna) of the electronic device, generate electric current and accumulate the generated electric current. Also, the second antenna part 120 may form a second magnetic field (i.e., a wireless signal or a radio wave signal) using the accumulated electric current. The second antenna part 120 may include a resonance circuit including a coil, a condenser or the like (not shown).

The first magnetic field and the second magnetic field may include resonance frequencies different from each other. For example, the resonance frequency (e.g., 13.56 Mega Hertz (MHz)) of the second magnetic field may be higher than the resonance frequency (e.g., 561 kilo Hertz (kHz)) of the first magnetic field.

The first antenna part 110 or the second antenna part 120 may include at least one ferrite not shown.

The communication IC 130 may be, for example, driven using electric current generated by the first antenna part 110 or the second antenna part 120. By using the magnetic field of the second antenna part 120, the communication IC 130 may transmit a wireless signal including data to an electronic device or may receive a wireless signal from the electronic device. Here, the communication IC 130 may include a memory chip (e.g., an NFC tag chip) memorizing data.

The communication IC 130 may, for example, provide short-range wireless communication (e.g., NFC or Bluetooth (BT)).

The conversion circuit 140 may change the first antenna part 110 to operate at a third frequency different from the first frequency. Or, the conversion circuit 140 may set the second antenna part 120 to operate at a fourth frequency different from the second frequency. The conversion circuit 140 may include at least one frequency matching circuit electrically connectable to the first antenna part 110 and/or the second antenna part 120. Or, the conversion circuit 140 may set an operation frequency of the first antenna part 110 and/or the second antenna part 120 in a way of varying impedance. For example, the conversion circuit 140 may include a variable impedance element.

Figure 2:
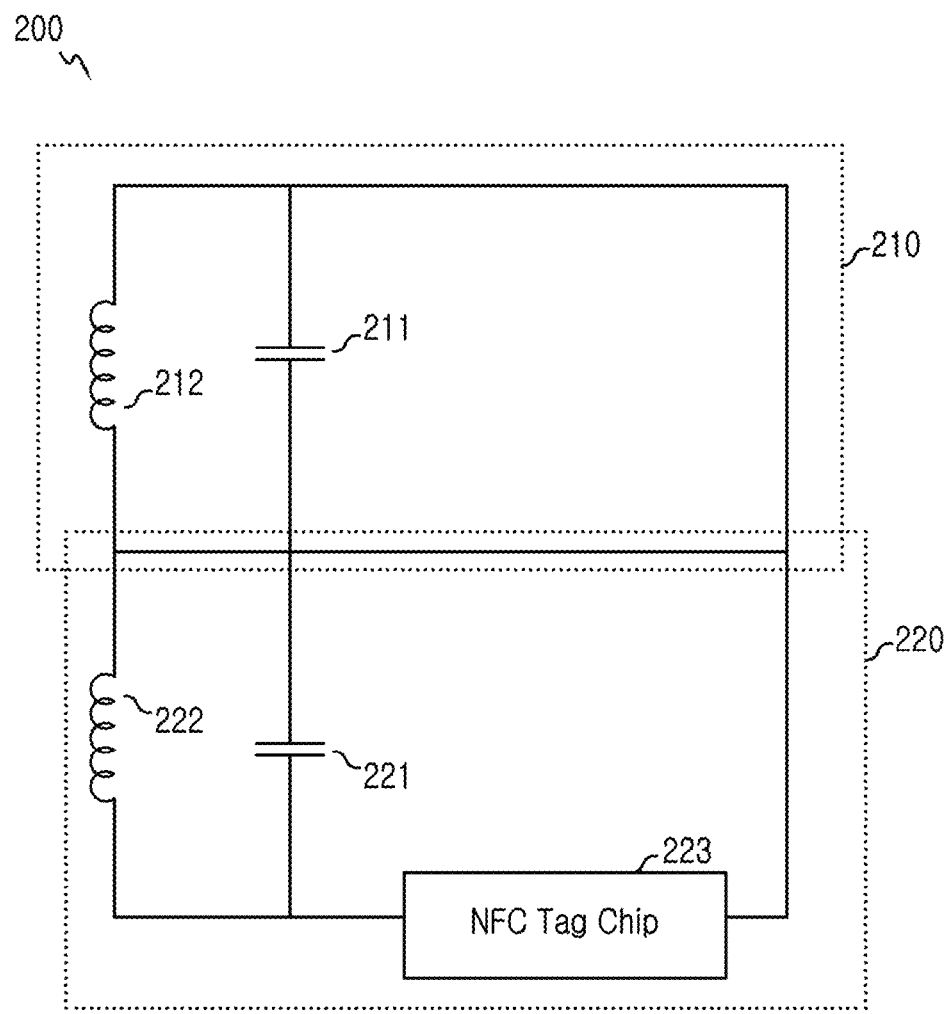
FIGS. 2 and 3 illustrate circuits of electronic pens according to various embodiments of the present disclosure.

FIG. 2 illustrates a circuit of an electronic pen according to an embodiment of the present disclosure.

Referring to FIG. 2, the electronic pen (e.g., the electronic pen 100 of FIG. 1) may include a first resonance circuit part 210 and a second resonance circuit part 220. The first resonance circuit part 210 and the second resonance circuit part 220 may be electrically connected with each other.

The first resonance circuit part 210 may include a capacitor 211 (e.g., a condenser) and/or an inductor 212 (e.g., a coil). The inductor 212 may be electromagnetically induced by a magnetic field of a digitizer panel of an electronic device and generate electric current. The capacitor 211 may accumulate the electric current generated by the inductor 212. The capacitor 211 may also accumulate electric current generated by an inductor 222 of the second resonance circuit part 220. The inductor 212 may form a first magnetic field by means of the accumulated electric current. The first magnetic field may apply a signal necessary for an input of the electronic pen 100.

The second resonance circuit part 220 may include a capacitor 221, an inductor 222, and/or an NFC tag chip 223. The inductor 222 may be electromagnetically induced by a magnetic field of an antenna (e.g., an NFC antenna) of the electronic device and generate electric current. The capacitor 221 may accumulate the electric current generated by the inductor 222. Or, the capacitor 221 may accumulate the electric current generated by the inductor 212 of the first resonance circuit part 210. The inductor 222 may form a second magnetic field by means of the accumulated electric current. The NFC tag chip 223 may transmit/receive data with the second magnetic field formed by the inductor 222. A resonance frequency of the second magnetic field may be 13.56 MHz.

Figure 3:
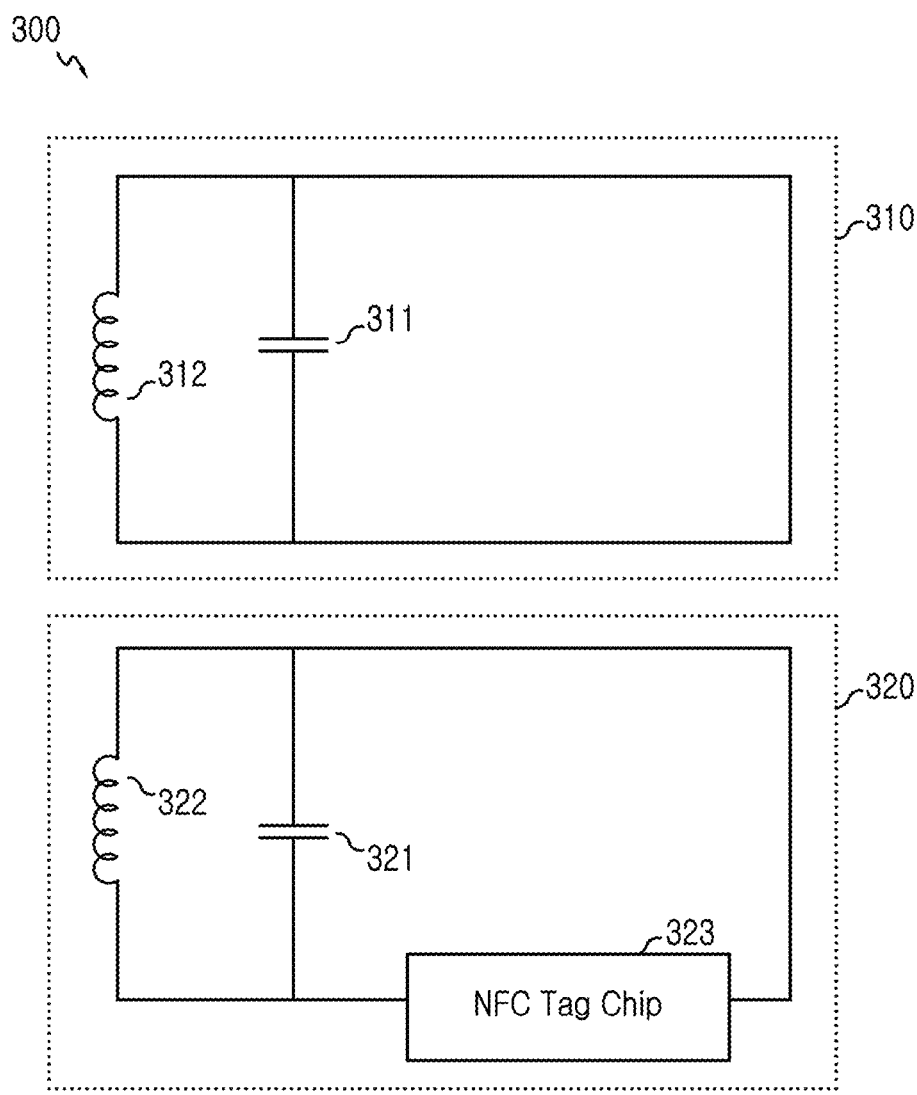

FIG. 3 illustrates a circuit of an electronic pen according to an embodiment of the present disclosure.

Referring to FIG. 3, the electronic pen 300 (e.g., the electronic pen 100 of FIG. 1) may include a first resonance circuit part 310 and a second resonance circuit part 320. The first resonance circuit part 310 and the second resonance circuit part 320 may be electrically disconnected from each other.

The first resonance circuit part 310 may include a capacitor 311 and/or an inductor 312. The inductor 312 may be electromagnetically induced by a magnetic field of a digitizer panel of an electronic device and generate electric current. The capacitor 311 may accumulate the electric current generated by the inductor 312. The inductor 312 may form a first magnetic field by means of the accumulated electric current. The first magnetic field may apply a signal necessary for an input of the electronic pen 100.

The second resonance circuit part 320 may include a capacitor 321, an inductor 322, and/or an NFC tag chip 323. The inductor 322 may be electromagnetically induced by a magnetic field of at least one antenna (e.g., an NFC antenna) of the electronic device and generate electric current. The capacitor 321 may accumulate the electric current generated by the inductor 322. The inductor 322 may form a second magnetic field by means of the accumulated electric current. The NFC tag chip 323 may transmit/receive data with the second magnetic field formed by the inductor 322.

Figure 4:
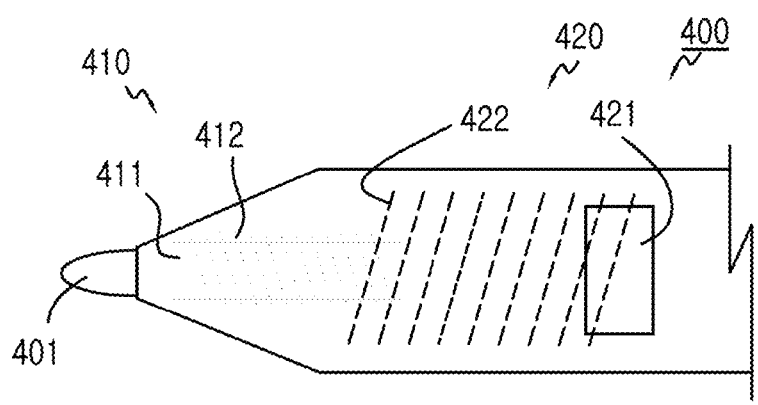
FIGS. 4 and 5 illustrate electronic pens according to various embodiments of the present disclosure.

FIG. 4 illustrates an electronic pen according to an embodiment of the present disclosure. The electronic pen 400 may be the electronic pen 200 illustrated in FIG. 2.

Referring to FIG. 4, the electronic pen 400 may include a first inductive resonator 410 and/or a second inductive resonator 420.

The first inductive resonator 410 (e.g., the first antenna part 110 of FIG. 1) may include a ferrite 411 (e.g., a ferrite core) and/or a coil 412. At least a portion of the ferrite 411 may be arranged to pass through the coil 412. The coil 412 may be arranged at an outer surface of the ferrite 411. The first inductive resonator 410 may be arranged closer to a tip 401 than the second inductive resonator 420.

The second inductive resonator 420 (e.g., the second antenna part 120 of FIG. 1) may include a ferrite 421 and/or a coil 422. The ferrite 421 may be arranged at one side of the coil 422.

The first inductive resonator 410 and the second inductive resonator 420 may have outer diameters different from each other. For example, the second inductive resonator 420 may include a larger outer diameter than the first inductive resonator 410. At least a portion of the first inductive resonator 410 may be inserted and arranged in the coil 422.

Figure 5:
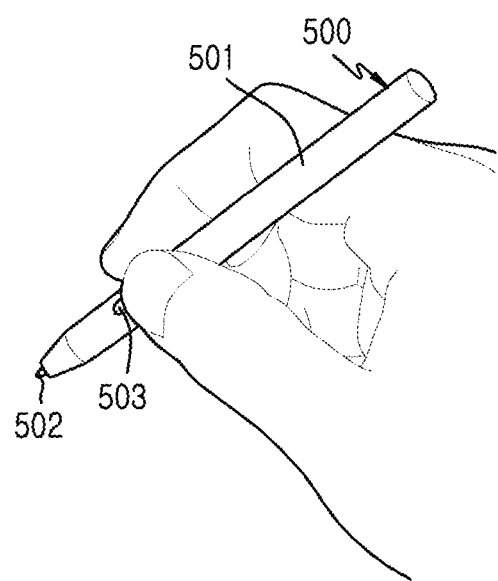

FIG. 5 illustrates an electronic pen according to various embodiments of the present disclosure.

Referring to FIG. 5, the electronic pen 500 may include a housing 501, a tip 502, or a button 503.

The housing 501 may provide a space for housing a plurality of electronic components. The housing 501 may be of a bar shape. The housing 501 may include one end which is opened relatively narrowly.

The tip 502 may be installed to protrude outside from the opened one end of the housing 501. The tip 502 may shift a constant range in the lengthwise direction of the housing 501, and perform self-centering. The self-centering refers to an operation of automatically restoring to the original position. In accordance to an embodiment, the shifting of the tip 502 may vary a capacitance of at least one capacitor, and induce a change of a magnetic field. Or, the shifting of the tip 502 may also change an impedance of a circuit (e.g., a circuit including a variable impedance element).

The button 503 may be installed in the housing 501 and be pressed. In accordance with an embodiment, the pressing of the button 503 may electrically connect an additional capacitor to a circuit, and induce a variation of a magnetic field. Or, the pressing of the button 503 may also change an impedance of the circuit (e.g., the circuit including the variable impedance element).

Figure 6:
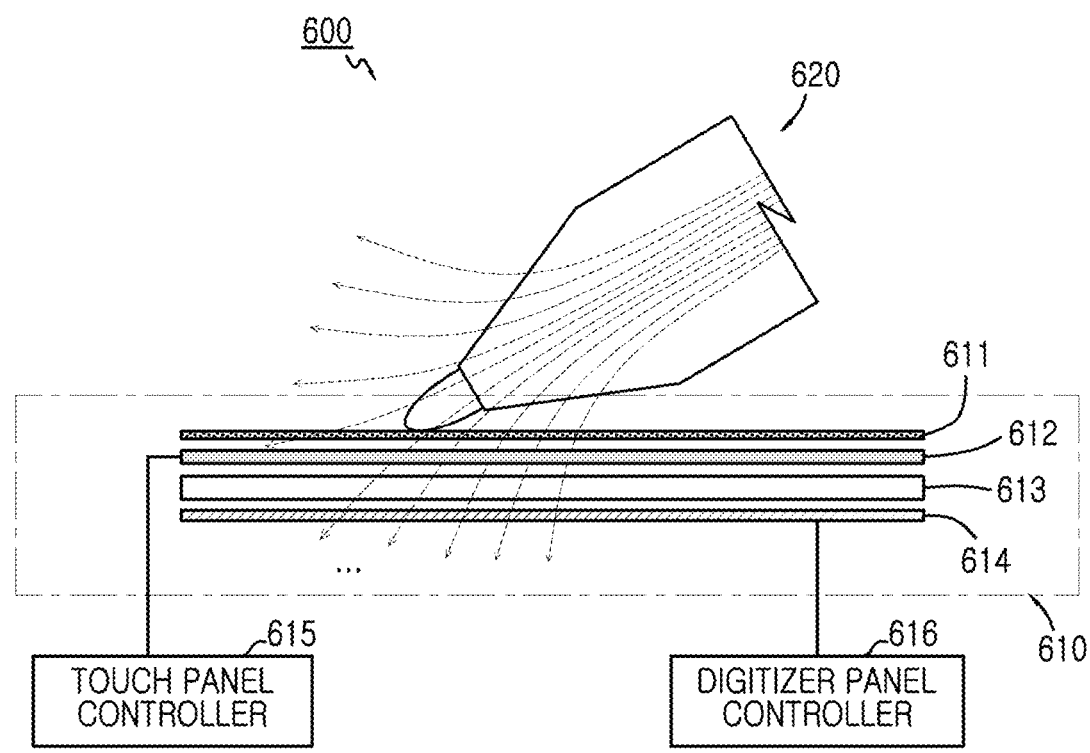
FIG. 6 illustrates a system according to an embodiment of the present disclosure.

FIG. 6 illustrates a system according to an embodiment of the present disclosure.

Referring to FIG. 6, the system 600 may include a touch screen 610, an electronic pen 620, a touch panel controller 615, and/or a digitizer panel controller 616.

The touch screen 610 may include a window 611, a touch panel 612, a display 613, and a digitizer panel 614.

The window 611 may be transparent and be arranged on the touch panel 612.

The touch panel 612 (e.g., a capacitive-type touch panel) may be arranged under the window 611. The touch panel 612 may include a plurality of electrode lines which are cross arranged.

The display 613 may be arranged under the touch panel 612, and display an image.

The digitizer panel 614 may be arranged under the display 613. The digitizer panel 614 may include electrode lines which are cross arranged. The digitizer panel 614 may receive electric current from the digitizer panel controller 616 and form a magnetic field. The digitizer panel 614 may include a film (e.g., an absorber film) performing a role of absorbing a magnetic field signal emitted from the electronic pen 620.

The touch panel controller 615 may detect a touch input corresponding to a variation of an electric field of the touch panel 612.

The digitizer panel controller 616 may detect an input corresponding to a variation of a magnetic field of the digitizer panel 614.

The touch screen 610 may include at least one antenna (e.g., an antenna sheet) not shown. For example, the at least one antenna may be mounted at the window 611, the touch panel 612, the display 613, and/or the digitizer panel 614. Or, the at least one antenna may be also interposed between laminate elements (e.g., the window 611, the touch panel 612, the display 613, or the digitizer panel 614). Or, the at least one antenna may be also arranged in at least one (e.g., a laminate element in which electrodes of the touch panel 612 or the digitizer panel 614 are arranged) of laminate elements of at least one of the window 611, the touch panel 612, the display 613, or the digitizer panel 614. Or, the at least one antenna may be also arranged between laminate elements of at least one of the window 611, the touch panel 612, the display 613, or the digitizer panel 614.

The at least one antenna may receive a supply of electric current from a communication module not shown, and form a magnetic field.

The touch screen 610 may include at least one magnetic sheet (e.g., a ferrite sheet) not shown. For example, at least one ferrite sheet may be arranged under the digitizer panel 614.

The ferrite sheet may receive magnetism or act on a magnetic field. The ferrite sheet may prevent an eddy current from being generated in a peripheral metal because of a magnetic field of at least one antenna. The ferrite sheet may lead to stable communication through at least one antenna.

For example, the antenna (e.g., an NFC antenna) not shown is arranged on the ferrite sheet, and the ferrite sheet may help the antenna to form a magnetic field for data communication in front of a screen.

Or, the antenna (e.g., the NFC antenna) not shown is arranged under the ferrite sheet, and the ferrite sheet may help the antenna to form the magnetic field for data communication in rear of the screen.

Also, the touch screen 610 may mount at least one sheet (e.g., an ElectroMagnetic Interference (EMI) sheet) for shielding electromagnetic noise.

The electronic pen 620 may be electromagnetically induced by a magnetic field of the digitizer panel 614, generate electric current, and form a magnetic field by this electric current. The magnetic field formed by the electronic pen 620 may apply a signal necessary for an input of the electronic pen 620, to the digitizer panel 614.

The electronic pen 620 may be electromagnetically induced by a magnetic field of at least one antenna of the touch screen 610, generate electric current, and form a magnetic field by this electric current. Also, the electronic pen 620 may transmit/receive data with at least one antenna using this magnetic field.

FIGS. 7A and 7B and FIGS. 8A and 8B illustrate antenna structures and radiation characteristics thereof according to various embodiments of the present disclosure.

Figure 7A:
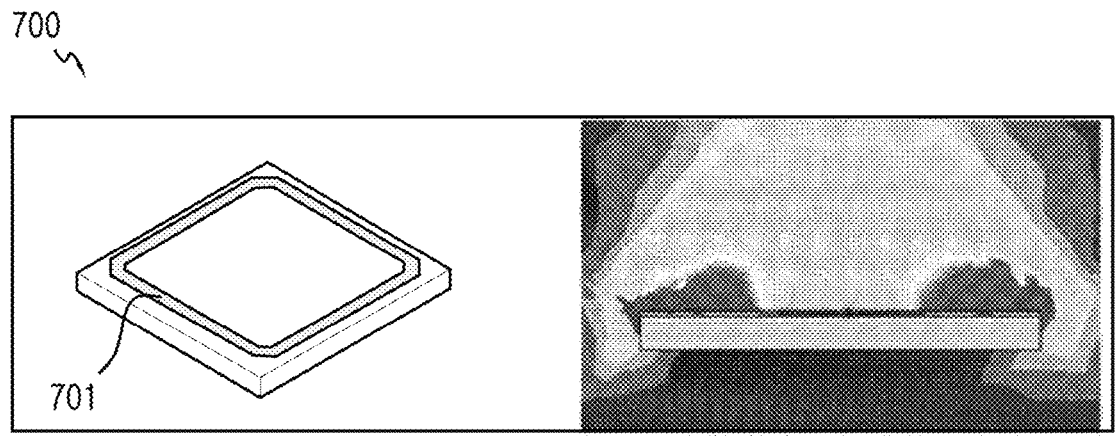
FIGS. 7A and 7B and FIGS. 8A and 8B illustrate antenna structures and radiation characteristics thereof according to various embodiments of the present disclosure.
Figure 7B:
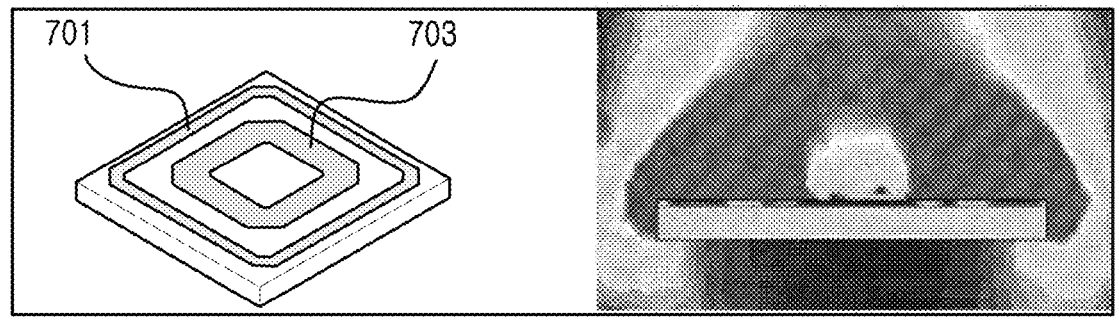

Referring to FIGS. 7A and 7B, the antenna structure 700 may include a first radiator 701 and/or a second radiator 703. The first radiator 701 and the second radiator 703 may be mounted on one surface together.

The first radiator 701 may be of a ring shape (e.g., a square ring). The second resonator 703 may be arranged inside the first radiator 701. The second radiator 703 may be of a ring shape (e.g., a square ring).

The first radiator 701 may be a short-range communication (e.g., NFC) antenna. The first radiator 701 may have a resonance frequency of 13.56 MHz.

The second radiator 703 may be an electronic pen input radiator, such as a digitizer panel (e.g., the digitizer panel 614 of FIG. 6). The second radiator 703 may have a resonance frequency of 561 kHz.

As illustrated in FIG. 7B, a resonance characteristic of the antenna structure 700 mounting both the first radiator 701 and the second radiator 703 represents a constructive interference as compared to a resonance characteristic of the antenna structure 700 mounting only the first radiator 701 as illustrated in FIG. 7A.

Figure 8A:
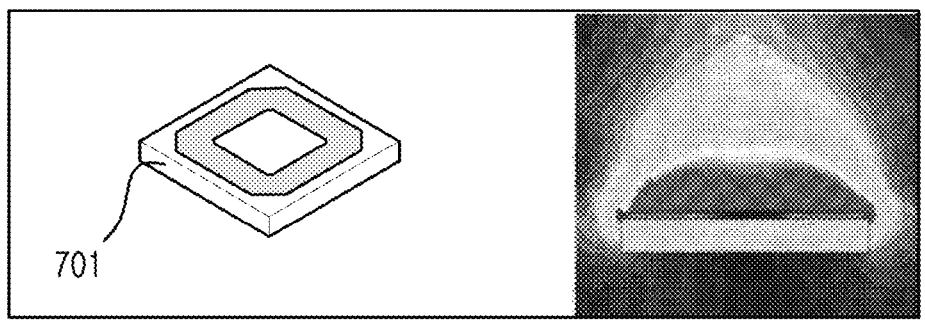
Figure 8B:
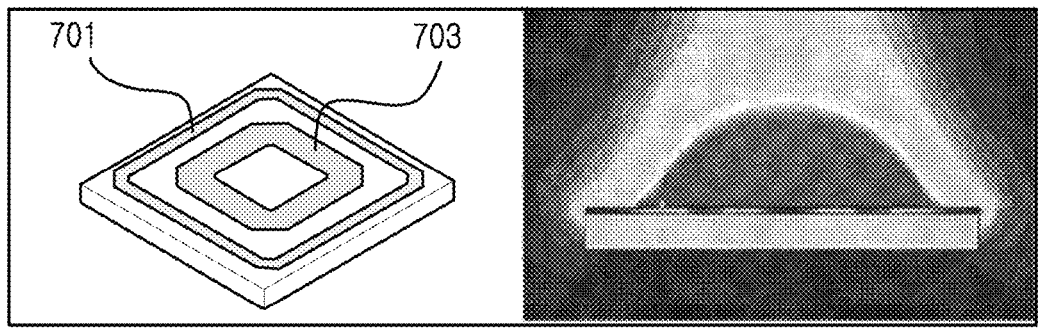

As illustrated in FIG. 8B, a resonance characteristic of the antenna structure 700 mounting both the first radiator 701 and the second radiator 703 represents a constructive interference as compared to a resonance characteristic of the antenna structure 700 mounting only the second radiator 703 as illustrated in FIG. 8A.

This constructive interference may improve a desired resonance characteristic for the first radiator 701 or the second radiator 703.

According to an embodiment of the present disclosure, a first electronic device (e.g., the electronic pen 100) may include a first antenna part 110 for exchanging a first wireless signal with a coordinate sensing sensor (e.g., the digitizer panel 614 of FIG. 6) of a second electronic device by electromagnetic induction, and a second antenna part 120 for exchanging a second wireless signal with a data communication antenna (e.g., an NFC antenna) of the second electronic device by electromagnetic induction.

According to an embodiment of the present disclosure, the first electronic device 100 may further include a circuit (e.g., a variable impedance element) for controlling the first antenna part 110 such that a frequency of the first wireless signal is changed.

According to an embodiment of the present disclosure, the first electronic device 100 may further include a communication IC 130. The communication IC 130 may process the second wireless signal and perform data communication (e.g., at least one short-range wireless communication).

According to an embodiment of the present disclosure, the second antenna part 120 may include a radiator having a larger outer diameter than that of the first antenna part 110.

According to an embodiment of the present disclosure, the electronic pen 100 may include a first antenna 110 for forming a first magnetic field for touch input by means of an electromagnetic induction and/or a second antenna 120 for forming a second magnetic field for data communication by means of an electromagnetic induction.

According to an embodiment of the present disclosure, the electronic pen 100 may further include a communication IC 130 for data communicating using the second antenna 120.

According to an embodiment of the present disclosure, the communication IC 130 may be driven by electric current generated by electromagnetic induction in the first antenna 110 or the second antenna 120.

According to an embodiment of the present disclosure, the communication IC 130 may process at least one short-range wireless communication (e.g., NFC or BT).

According to an embodiment of the present disclosure, the communication IC 130 may include a tag (e.g. an NFC tag chip).

Figure 9:
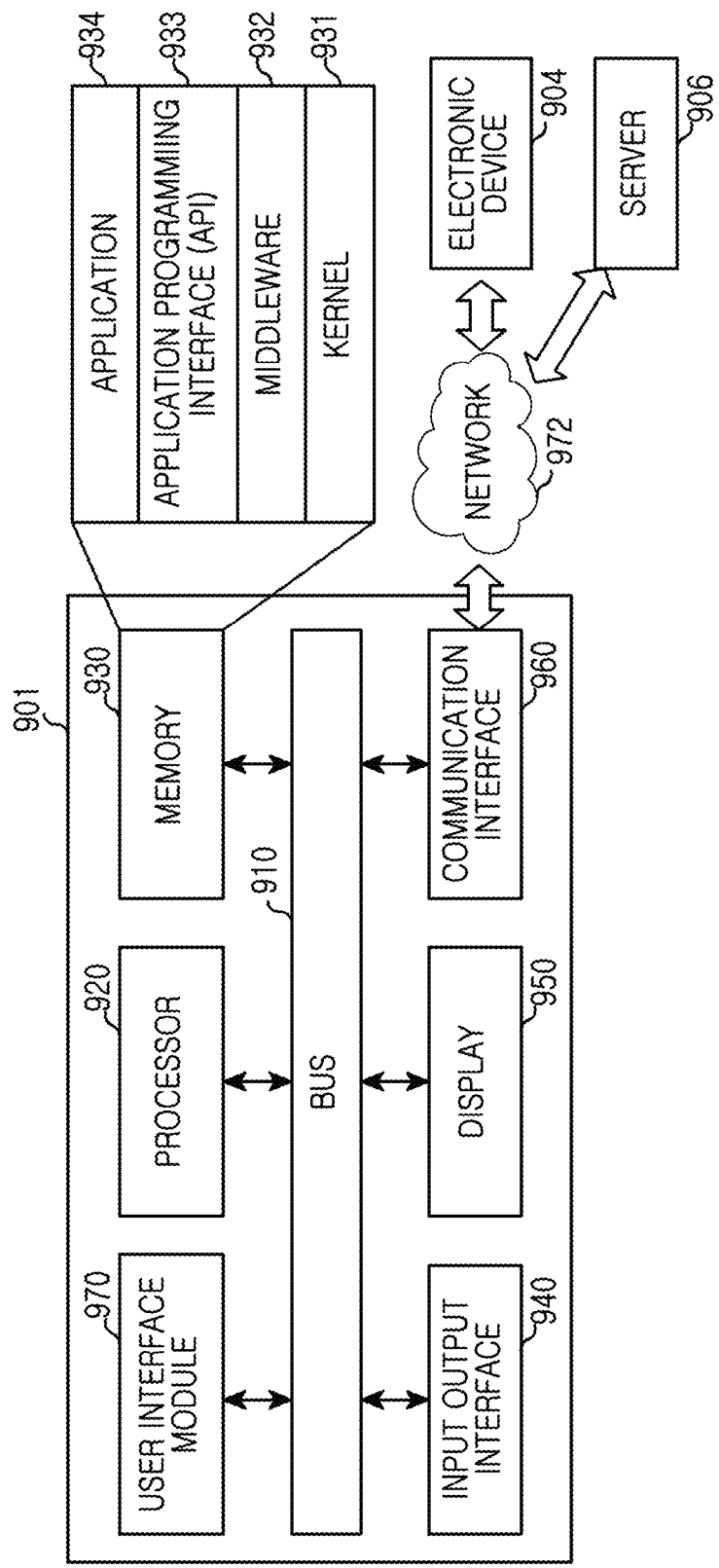
FIG. 9 illustrates a network environment including an electronic device according to an embodiment of the present disclosure.

FIG. 9 illustrates a network environment including an electronic device according to various embodiments of the present disclosure.

Referring to FIG. 9, the electronic device 901 may include a bus 910, a processor 920, a memory 930, an input/output interface 940, a display 950, a communication interface 960, and a user interface module 970.

The bus 910 may be a circuit connecting the aforementioned constituent elements with one another and forwarding communication (e.g., a control message) between the aforementioned constituent elements.

The processor 920 may, for example, receive instructions from the aforementioned other constituent elements (e.g., the memory 930, the input/output interface 940, the display 950, the communication interface 960, the user interface module 970 or the like) through the bus 910, and decipher the received instructions, and execute operation or data processing according to the deciphered instructions.

The memory 930 may store an instruction or data that is received from the processor 920 or the other constituent elements (e.g., the input/output interface 940, the display 950, the communication interface 960, the user interface module 970 or the like) or is generated by the processor 920 or the other constituent elements. The memory 930 may, for example, include programming modules such as a kernel 931, middleware 932, an Application Programming Interface (API) 933, an application 934 or the like. The aforementioned programming modules each may be comprised of software, firmware, hardware or a combination of at least two or more of them.

The kernel 931 may control or manage system resources (e.g., the bus 910, the processor 920, the memory 930 or the like) used for executing operations or functions implemented in the remnant other programming modules, for example, the middleware 932, the API 933, or the application 934. Also, the kernel 931 may provide an interface enabling the middleware 932, the API 933, or the application 934 to connect and control or manage the individual constituent element of the electronic device 901.

The middleware 932 may perform a relay role of enabling the API 933 or the application 934 to communicate and exchange data with the kernel 931. Also, in relation to work requests received from the application 934, the middleware 932 may, for example, perform control (e.g., scheduling or load balancing) for the work requests using a method of allocating at least one application among the applications 934 priority order capable of using the system resources (e.g., the bus 910, the processor 920, the memory 930 or the like) of the electronic device 901.

The API 933 is an interface enabling the application 934 to control a function provided by the kernel 931 or the middleware 932. The API 933 may, for example, include at least one interface or function (e.g., an instruction) for file control, window control, picture processing, character control or the like.

According to various embodiments, the application 934 may include a Short Message Service (SMS)/Multimedia Message Service (MMS) application, an electronic mail (e-mail) application, a calendar application, an alarm application, a health care application (e.g., an application measuring momentum, blood sugar or the like), environment information application (e.g., an application providing air pressure, humidity, temperature information or the like) or the like. The application 934 may be an application related with information exchange between the electronic device 901 and an external electronic device (e.g., an electronic device 904). The application related with the information exchange may include, for example, a notification relay application for relaying specific information to the external electronic device, or a device management application for managing the external electronic device.

For example, the notification relay application may include a function of relaying to the external electronic device (e.g., the electronic device 904) notification information generated in other applications (e.g., the SMS/MMS application, the e-mail application, the health care application, the environment information application or the like) of the electronic device 901. Additionally or alternatively, the notification relay application may, for example, receive notification information from the external electronic device (e.g., the electronic device 904) and provide the received notification information to a user. The device management application may, for example, manage (e.g., install, delete or update) a function (e.g., turn-on/turn-off of the external electronic device itself (or some constituent components), or adjustment of a brightness (or resolution) of a display) of at least a part of the external electronic device (e.g., the electronic device 904) communicating with the electronic device 901, an application operating in the external electronic device, or a service (e.g., a telephony service or a message service) provided in the external electronic device.

According to various embodiments, the application 934 may include an application designated according to an attribute (e.g., the kind of electronic device) of the external electronic device (e.g., the electronic device 904). For example, when the external electronic device is an MP3 player, the application 934 may include an application related with music playback. Similarly, when the external electronic device is a mobile medical instrument, the application 934 may include an application related with health care. According to an embodiment, the application 934 may include at least one of an application designated to the electronic device 901 or an application received from the external electronic device (e.g., a server 906 or the electronic device 904).

The input/output interface 940 may forward an instruction or data, which is inputted from a user through an input/output device (e.g., a sensor, a keyboard or a touch screen), for example, to the processor 920, the memory 930, the communication interface 960, or the user interface module 970 through the bus 910. For example, the input/output interface 940 may provide data about a user's touch inputted through the touch screen, to the processor 920. Also, the input/output interface 940 may, for example, output through an input/output device (e.g., a speaker or a display) an instruction or data which is received from the processor 920, the memory 930, the communication interface 960, or the user interface module 970 through the bus 910. For example, the input/output interface 940 may output voice data, which is processed through the processor 920, to the user through the speaker.

The display 950 may display various information (e.g., multimedia data, text data, or the like) to a user.

The communication interface 960 may connect communication between the electronic device 901 and the external device (e.g., the electronic device 904 or the server 906). For example, the communication interface 960 may be connected to a network 972 through wireless communication or wired communication, and communicate with an external device. The wireless communication may, for example, include at least one of Wireless Fidelity (WiFi), BT, NFC, GPS or cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM) or the like). The wired communication may include at least one of a Universe Serial Bus (USB), a High Definition Multimedia Interface (HDMI), a Recommended Standard-232 (RS-232), or a Plain Old Telephone Service (POTS).

According to an embodiment, the network 972 may be a telecommunications network. The telecommunications network may include at least one of a computer network, the Internet, internet of things, or a telephone network. According to an embodiment, a protocol (e.g., a transport layer protocol, a data link layer protocol, or a physical layer protocol) for communication between the electronic device 901 and an external device may be supported in at least one of the application 934, the application programming interface 933, the middleware 932, the kernel 931, or the communication interface 960.

The user interface module 970 may transmit/receive a wireless signal through at least one radiator (e.g., a digitizer panel or an antenna), and may control a user interface operation related to this. The user interface module 970 of the electronic device 901 may control at least some functions of the electronic device 901 such that the electronic device 901 interworks with other electronic device (e.g., the electronic device 904 or the server 906), using the processor 920 or independently of the processor 920. Additional information about the user interface module 970 is provided with reference to FIG. 10 and the following drawings described below.

Figure 10:
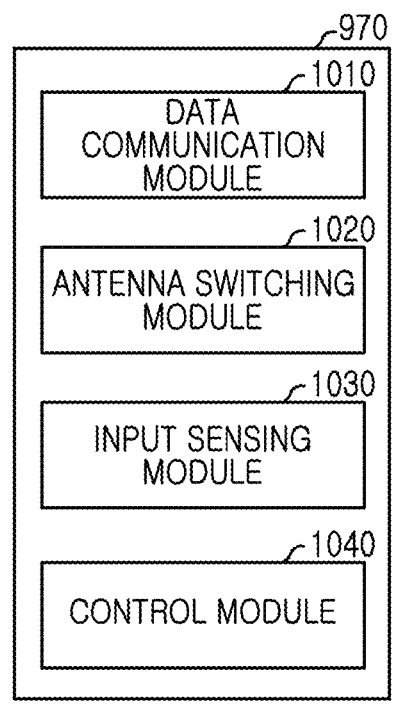
FIG. 10 illustrates a block diagram of a user interface module of an electronic device according to an embodiment of the present disclosure.

FIG. 10 illustrates a block diagram of a user interface module of an electronic device, such as the user interface module 970 of the electronic device 901, according to an embodiment of the present disclosure.

Referring to FIG. 10, the user interface module 970 may include a data communication module 1010, an antenna switching module 1020, an input sensing module 1030, or a control module 1040.

The data communication module 1010 may communicate data with an external electronic device (e.g., an electronic pen). The data communication module 1010 may transmit data to the external electronic device (e.g., the electronic pen) in response to an input sensed by the input sensing module 1030. The data communication module 1010 may also receive data from the external electronic device (e.g., the electronic pen). Also, the data communication module 1010 may initiate data communication with the external electronic device in response to the input sensed by the input sensing module 1030.

The data communication module 1010 may communicate data using at least one antenna (e.g., a WiFi antenna, a BT antenna, an NFC antenna, a GPS antenna or the like).

The antenna switching module 1020 may select at least one antenna used for the data communication module 1010. For example, the antenna switching module 1020 may select at least one antenna in response to an input sensed by the input sensing module 1030.

The input sensing module 1030 may sense an input generated through at least one input device (e.g., a touch panel, a pen sensor, a key, an ultrasonic input device, a sensor, or the like). For example, the input sensing module 1030 (e.g., a touch panel controller or a digitizer panel controller) may sense an input generated through a panel (e.g., a touch panel or a digitizer panel). The input sensing module 1030 (e.g., the sensor module) may sense a detection value generated through at least one sensor (e.g., a gesture sensor, a proximity sensor, a grip sensor, a gyro sensor, an acceleration sensor, a geomagnetic sensor, an air pressure sensor, a temperature/humidity sensor, a hall sensor, a Red, Green, Blue (RGB) sensor, an illumination sensor, a biophysical sensor, a Ultra Violet (UV) sensor, or a stylus detector). Or, the input sensing module 1030 may sense an input generated through the external electronic device (e.g., the electronic pen).

The control module 1040 may control (e.g., display control) an operation corresponding to an input sensed by the input sensing module 1030. Or, the control module 1040 may process (e.g., display or store) data received by the data communication module 1010.

Figure 11:
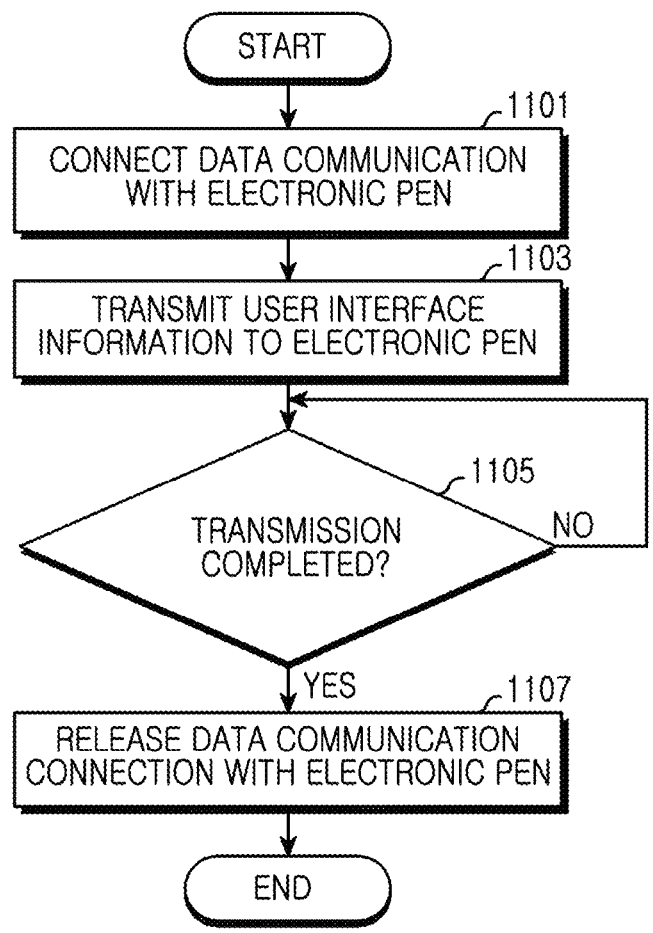
FIGS. 11 and 12 illustrate flowcharts of operation procedures of an electronic device according to various embodiments of the present disclosure.

FIG. 11 illustrates a flowchart of an operation procedure of an electronic device according to an embodiment of the present disclosure.

Referring to FIG. 11, in operation 1101, the user interface module 970 (e.g., the data communication module 1010) may connect data communication with an electronic pen. The user interface module 970 may acquire identification information (e.g., identification (ID)) from the electronic pen, and go through an authentication procedure using the identification information, and initiate data communication with the electronic pen.

In operation 1103, the user interface module 970 (e.g., the data communication module 1010) may transmit user interface information to the electronic pen. The user interface information may include information that assists in making a smooth interaction between the electronic device and a user. Or, the user interface information may include information with which the user and a program interact with each other in order to exchange information between the user and the electronic device. The user interface information may include information about an input (e.g., touch input control) or information about an output (e.g., contents display control). For example, the user interface information may include an electronic pen related setting, for example, a pen type (i.e., a pencil, a brush and the like), a pen color and the like. Or, the user interface information may include a procedure (e.g., a procedure of file movement using the electronic pen) of a specific operation. Or, the user interface information may include link related information of a telephone number, an e-mail address, a Uniform Resource Locator (URL) or the like.

In operation 1105, the user interface module 970 (e.g., the data communication module 1010) may determine if transmission of the user interface information is completed.

If the transmission of the user interface information is completed, in operation 1107, the user interface module 970 (e.g., the data communication module 1010) may release the data communication connection with the electronic pen. If the communication connection is released, the user interface module 970 may inactivate at least one related element, and save power.

Figure 12:
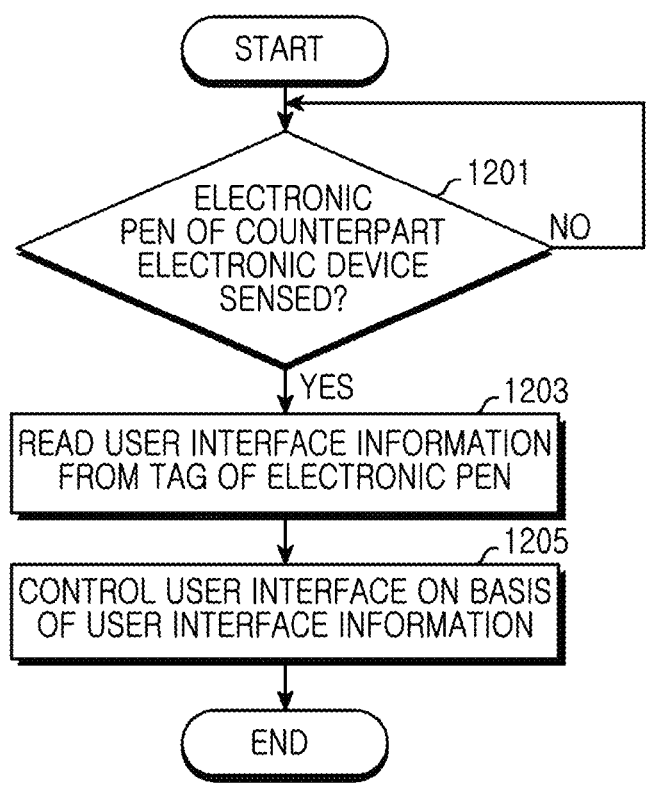

FIG. 12 illustrates a flowchart of an operation procedure of an electronic device according to an embodiment of the present disclosure.

Referring to FIG. 12, in operation 1201, the user interface module 970 (e.g., the data communication module 1010) may sense an electronic pen of a counterpart electronic device (e.g., the electronic device 904 of FIG. 9).

In operation 1203, the user interface module 970 (e.g., the data communication module 1010) may read user interface information from a tag of the electronic pen.

In operation 1205, the user interface module 970 (e.g., the control module 1040) may control (e.g., input control or display control) a user interface on the basis of the user interface information.

Figure 13:
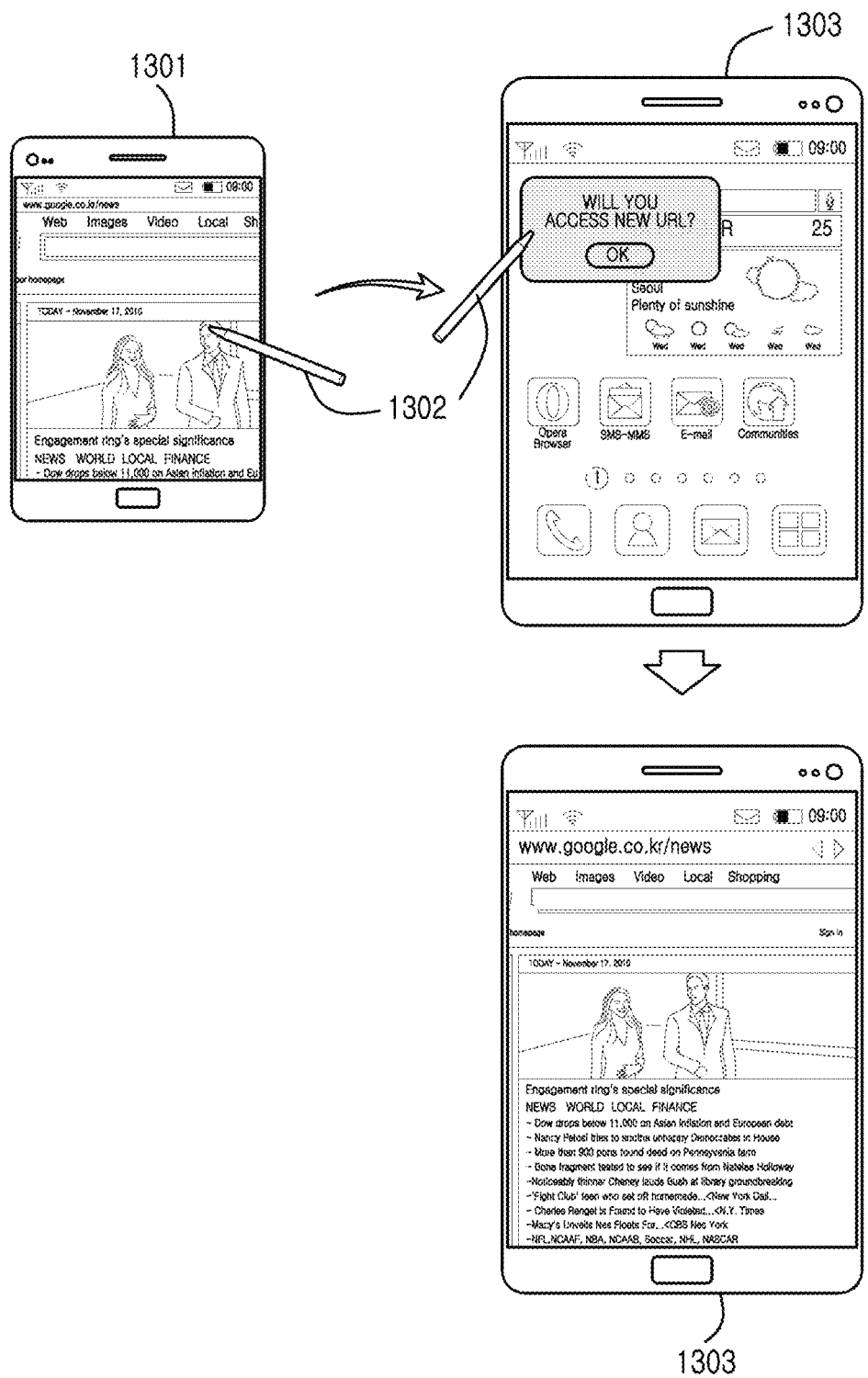
FIGS. 13, 14, and 15 illustrate user interface screens according to various embodiments of the present disclosure.

FIG. 13 illustrates a user interface screen according to an embodiment of the present disclosure.

Referring to FIG. 13, a user may select contents with an electronic pen 1302, from a web page displayed on a screen of a first electronic device 1301. The first electronic device 1301 may transmit link information (e.g., a URL) related to the selected contents, to the electronic pen 1302. The electronic pen 1302 may receive and/or store the URL from the first electronic device 1301. If the user selects a screen of a second electronic device 1303 with the electronic pen 1302, the electronic pen 1302 may transmit the URL to the second electronic device 1303. The second electronic device 1303 may receive the URL from the electronic pen 1302, and execute an operation (e.g., a URL access and the like) of interworking a program related to the received URL and the like.

Figure 14:
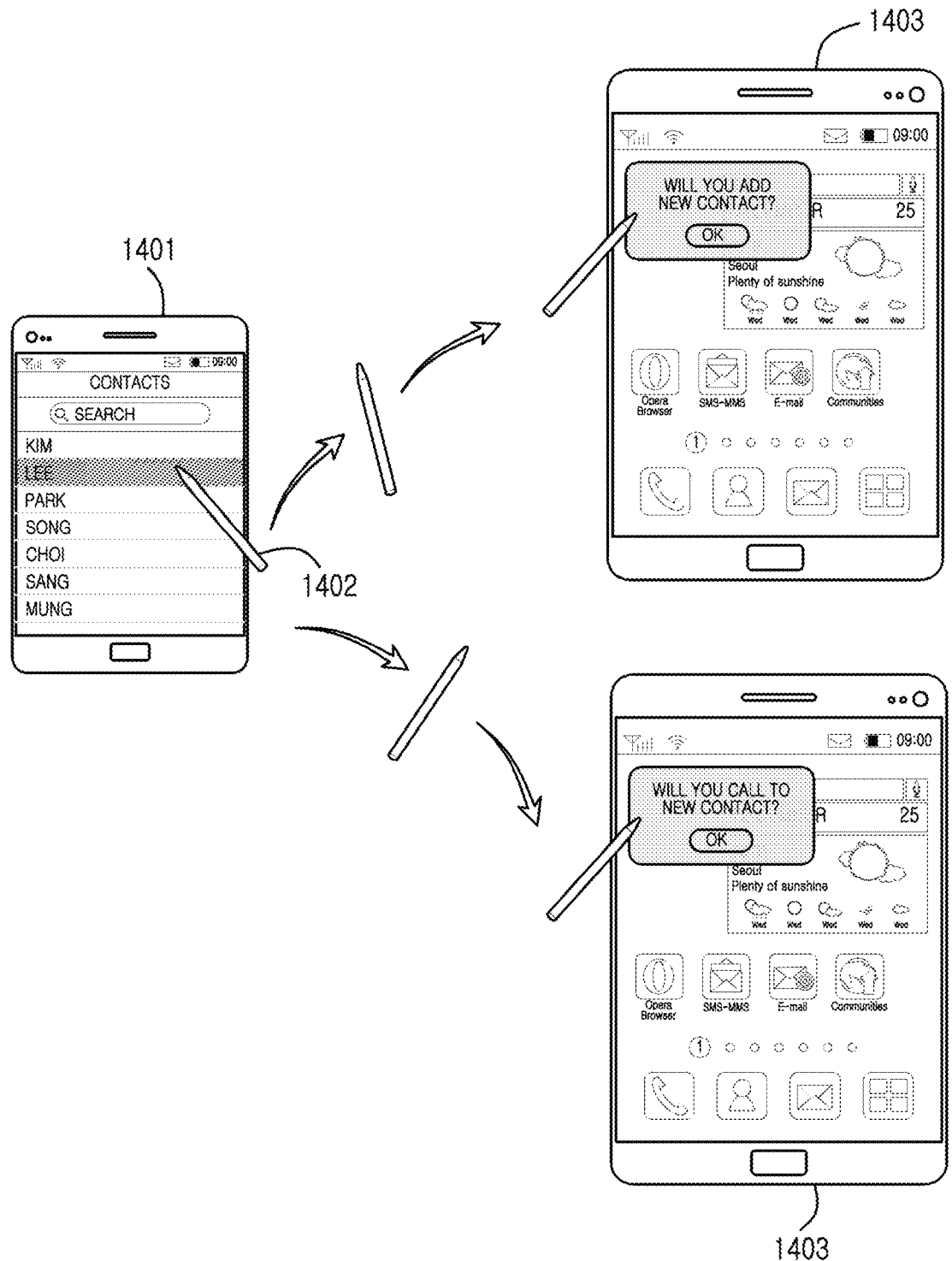

FIG. 14 illustrates a user interface screen according to an embodiment of the present disclosure.

Referring to FIG. 14, a user may select at least one or more contacts with an electronic pen 1402, from a contact list displayed on a screen of a first electronic device 1401. The first electronic device 1401 may transmit contact information of the contact selected with the electronic pen 1402, to the electronic pen 1402. The electronic pen 1402 may receive and/or store the contact information from the first electronic device 1401. If the user selects a screen of a second electronic device 1403 with the electronic pen 1402, the electronic pen 1402 may transmit the contact information to the second electronic device 1403. The second electronic device 1403 may receive the contact information from the electronic pen 1402, and execute an operation (e.g., contact registration, telephony or the like) of interworking a program related to the received contact information and the like.

Figure 15:
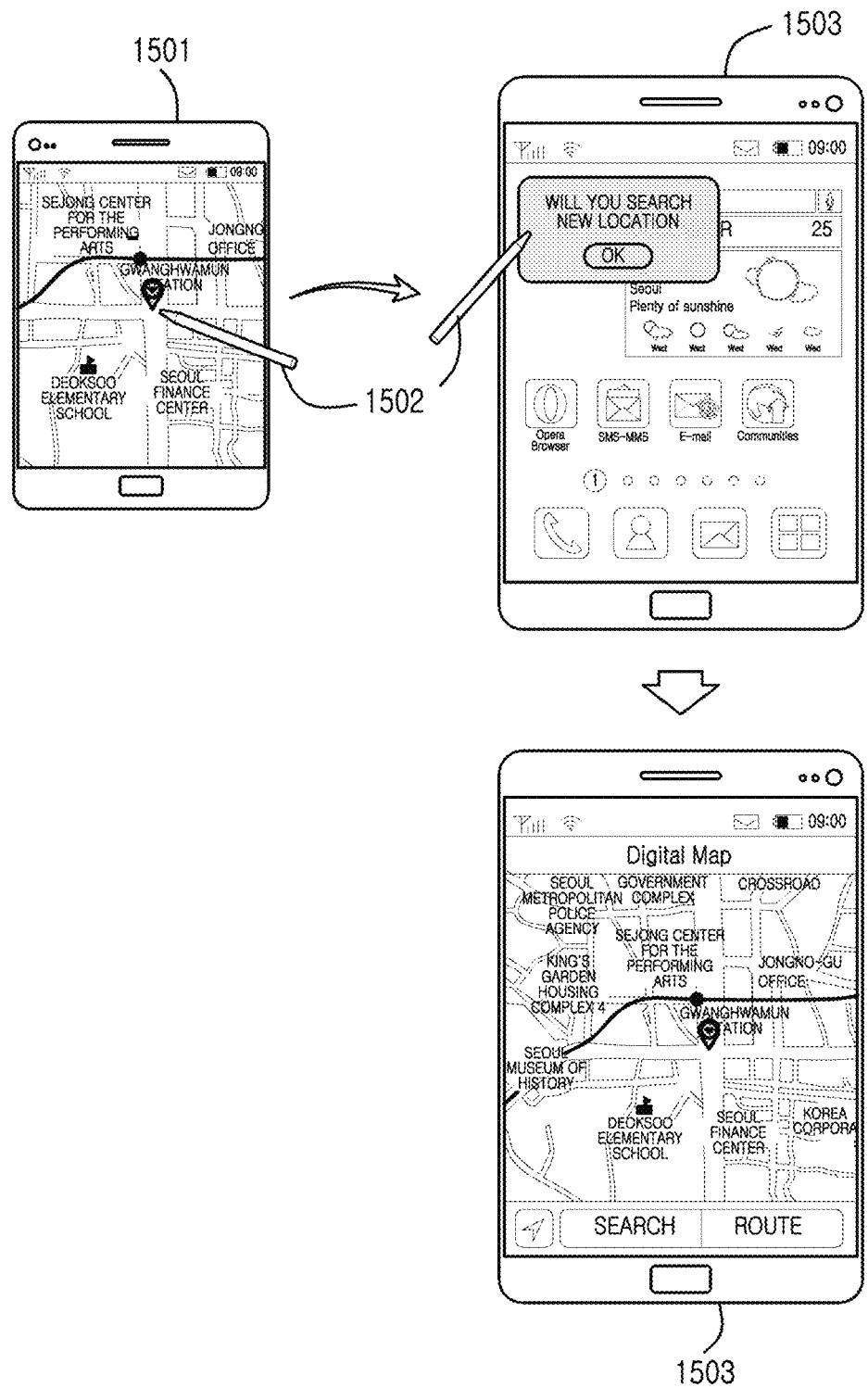

FIG. 15 illustrates a user interface screen according to an embodiment of the present disclosure.

Referring to FIG. 15, a user may select a location with an electronic pen 1502, from an electronic map displayed on a screen of a first electronic device 1501. The first electronic device 1501 may transmit location information about the selected location to the electronic pen 1502. The electronic pen 1502 may receive and/or store the location information from the first electronic device 1501. If the user selects a screen of a second electronic device 1503 with the electronic pen 1502, the electronic pen 1502 may transmit the location information to the second electronic device 1503. The second electronic pen 1503 may receive the location information from the electronic pen 1502, and execute an operation (e.g., location search through the electronic map and the like) of interworking a program related to the received location information and the like.

Figure 16:
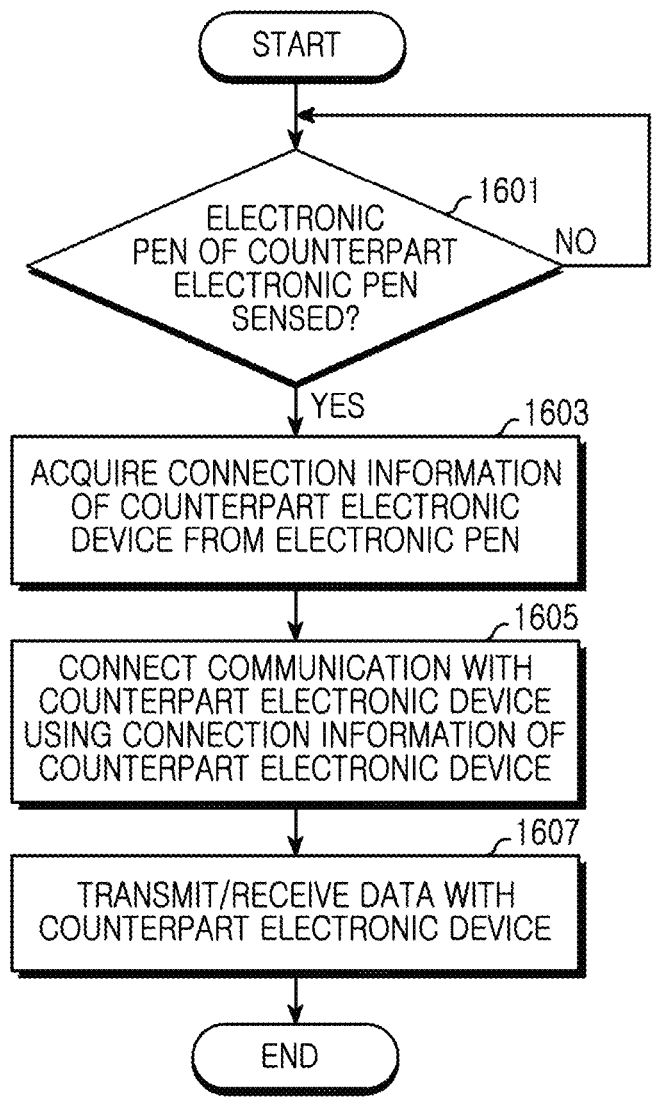
FIG. 16 illustrates a flowchart of an operation procedure of an electronic device according to an embodiment of the present disclosure.

FIG. 16 illustrates a flowchart of an operation procedure of an electronic device according to an embodiment of the present disclosure.

Referring to FIG. 16, in operation 1601, the user interface module 970 (e.g., the data communication module 1010) may determine if it senses an electronic pen of a counterpart electronic device (e.g., the electronic device 904 of FIG. 9).

In operation 1603, the user interface module 970 (e.g., the data communication module 1010) may acquire connection information of the counterpart electronic device from the electronic pen of the counterpart electronic device.

In operation 1605, the user interface module 970 (e.g., the data communication module 1010) may establish communication, that is connect (e.g., NFC, BT or WiFi) with the counterpart electronic device using the connection information of the counterpart electronic device.

In operation 1607, the user interface module 970 (e.g., the data communication module 1010) may transmit/receive (exchange) data with the counterpart electronic device.

Figure 17:
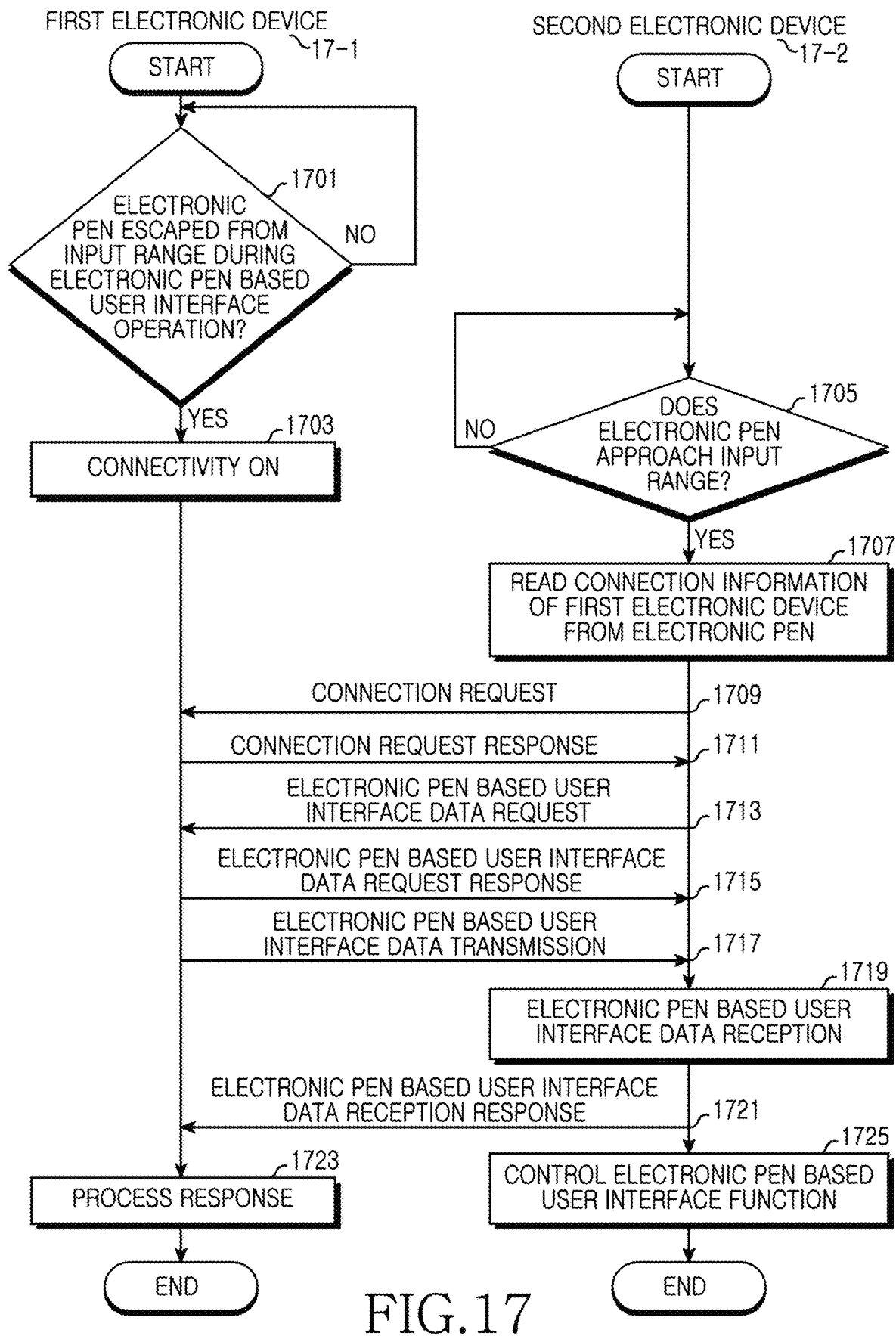
FIG. 17 illustrates a communication flow among a plurality of electronic devices according to an embodiment of the present disclosure.

FIG. 17 illustrates a communication flow among a plurality of electronic devices according to various embodiments of the present disclosure. A first electronic device 17-1 and a second electronic device 17-2 may include the electronic device 901 illustrated in FIG. 9.

Referring to FIG. 17, in operation 1701, the first electronic device 17-1 may determine if an electronic pen is escaped (i.e., moved away from) from an input range (e.g., touch or hovering) during an electronic pen based user interface operation.

If it is determined that the electronic pen has escaped from the input range, the first electronic device 17-1 may enter a "connectivity on" state for communication connection with the second electronic device 17-2 in operation 1703. For example, if the connectivity is On, a communication (e.g., NFC, BT or WiFi) connection between the first electronic device 17-1 and the second electronic device 17-2 may be established quickly. Or, if the connectivity is On, the first electronic device 17-1 may permit an access of the second electronic device 17-2.

In operation 1705, the second electronic device 17-2 may determine if the electronic pen approaches the input range (e.g., touch or hovering or electronic tag recognition).

If it is determined that the electronic pen approaches the input range, the second electronic device 17-2 may read connection information (e.g., a device address, ID information and the like) of the first electronic device 17-1 from the electronic pen in operation 1707. For example, the second electronic device 17-2 may read the connection information (e.g., the device address, the ID information and the like) of the first electronic device 17-1 from an NFC tag stored in the electronic pen.

In operation 1709, the second electronic device 17-2 may send a connection request to the first electronic device 17-1 using the connection information of the first electronic device 17-1.

In operation 1711, the first electronic device 17-1 may send a connection request acceptance response to the second electronic device 17-2.

In operation 1713, the second electronic device 17-2 may send a request for electronic pen based user interface data (e.g., image data and/or voice data) to the first electronic device 17-1.

In operation 1715, the first electronic device 17-1 may send an acceptance response of the request for the electronic pen based user interface data to the second electronic device 17-2.

In operation 1717, the first electronic device 17-1 may transmit the electronic pen based user interface data to the second electronic device 17-2.

In operation 1719, the second electronic device 17-2 may receive the electronic pen based user interface data from the first electronic device 17-1.

In operation 1721, the second electronic device 17-2 may send a response of completion of reception of the electronic pen based user interface data to the first electronic device 17-1.

In operation 1723, the first electronic device 17-1 may process the response of the completion of the transmission of the electronic pen based user interface data. For example, the first electronic device 17-1 may inactivate an electronic pen based user interface operation.

In operation 1725, the second electronic device 17-2 may control an electronic pen user interface on the basis of the electronic pen based user interface data. For example, the second electronic device 17-2 may control (e.g., display control) a function in response to an input (e.g., touch or hovering) of the electronic pen.

Figure 18:
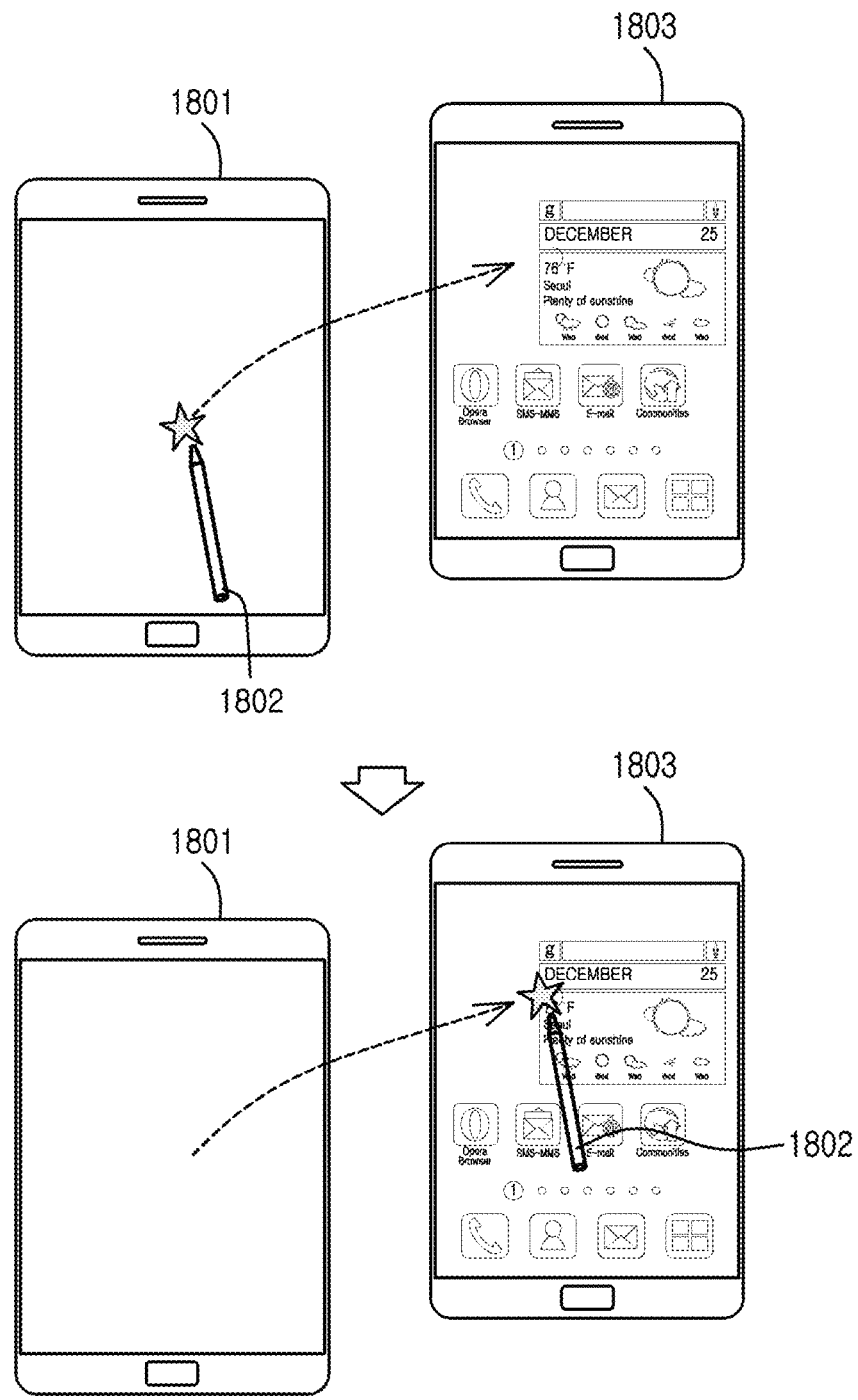
FIGS. 18, 19, 20, and 21 illustrate user interface screens according to an embodiment of the present disclosure.

FIG. 18 illustrates a user interface screen according to an embodiment of the present disclosure.

Referring to FIG. 18, a user may drag contents displayed on a screen of a first electronic device 1801 in a state of selecting the contents with an electronic pen 1802. If the electronic pen 1802 is escaped (e.g., moves away) from the screen of the first electronic device 1801, the electronic pen 1802 may be escaped from an input range of the first electronic device 1801. The first electronic device 1801 may sense the input range escape of the electronic pen 1802, and make connectivity on for the sake of fast connection with another electronic device. If the electronic pen 1802 is arranged on a screen of a second electronic device 1803, the electronic pen 1802 may enter an input range of the second electronic device 1803. The second electronic device 1803 may sense input range approaching of the electronic pen 1802, and read connection information about the first electronic device 1801 from tag information of the electronic pen 1802. The second electronic device 1803 may access the first electronic device 1801, using the connection information about the first electronic device 1801. The second electronic device 1803 may send a request for data (or execution information) about an electronic pen 1802 based user interface operation (e.g., an operation of moving contents by touch and drag), to the first electronic device 1801. The first electronic device 1801 may provide data (e.g., as illustrated, a star-like icon and data related to this) about the electronic pen 1802 based user interface operation, to the second electronic device 1803. The second electronic device 1803 may display control on the basis of the received electronic pen 1802 based user interface data. For example, if the user touches and drags on the screen of the second electronic device 1803 with the electronic pen 1802, the second electronic device 1803 may provide a display shown in the first electronic device 1801.

Figure 19:
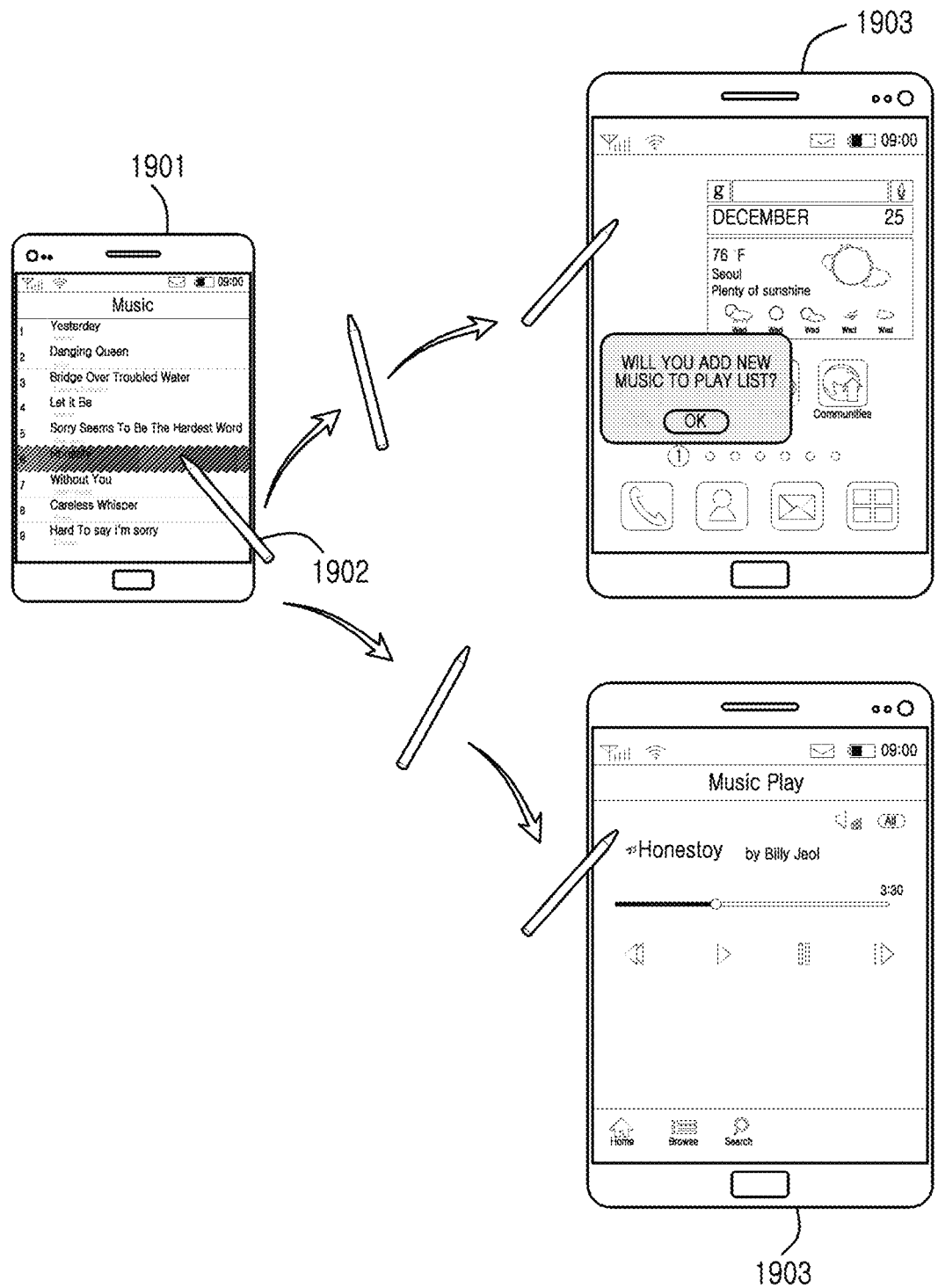

FIG. 19 illustrates a user interface screen according to an embodiment of the present disclosure.

Referring to FIG. 19, a user may select a music file from a music list displayed on a screen of a first electronic device 1901, with an electronic pen 1902. If the user selects a screen of a second electronic device 1903 with the electronic pen 1902, the second electronic device 1903 may access the first electronic device 1901 using connection information included in the electronic pen 1902. The second electronic device 1903 may receive a music file from the first electronic device 1901, and execute an operation (e.g., adding to a play list, playing, or the like) of interworking a program related to the received music file and the like.

Figure 20:
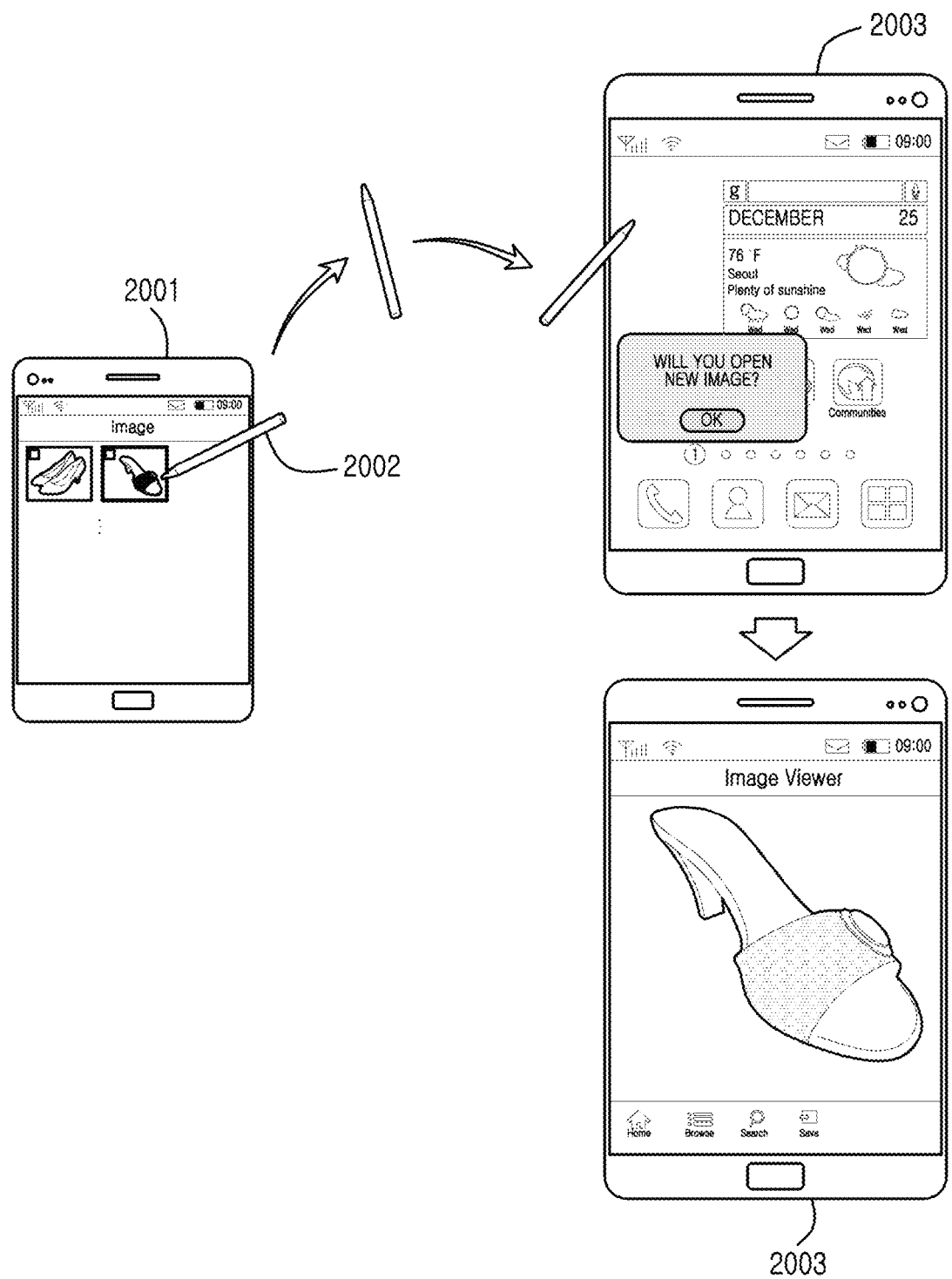

FIG. 20 illustrates a user interface screen according to an embodiment of the present disclosure.

Referring to FIG. 20, a user may select at least one or more picture files from an image thumbnail displayed on a screen of a first electronic device 2001, with an electronic pen 2002. If the user selects a screen of a second electronic device 2003 with the electronic pen 2002, the second electronic device 2003 may access the first electronic device 2001 using connection information included in the electronic pen 2002. The second electronic device 2003 may receive a picture file from the first electronic device 2001, and execute an operation (e.g., opening a picture file through an image viewer and the like) of interworking a program related to the received picture file and the like.

Figure 21:
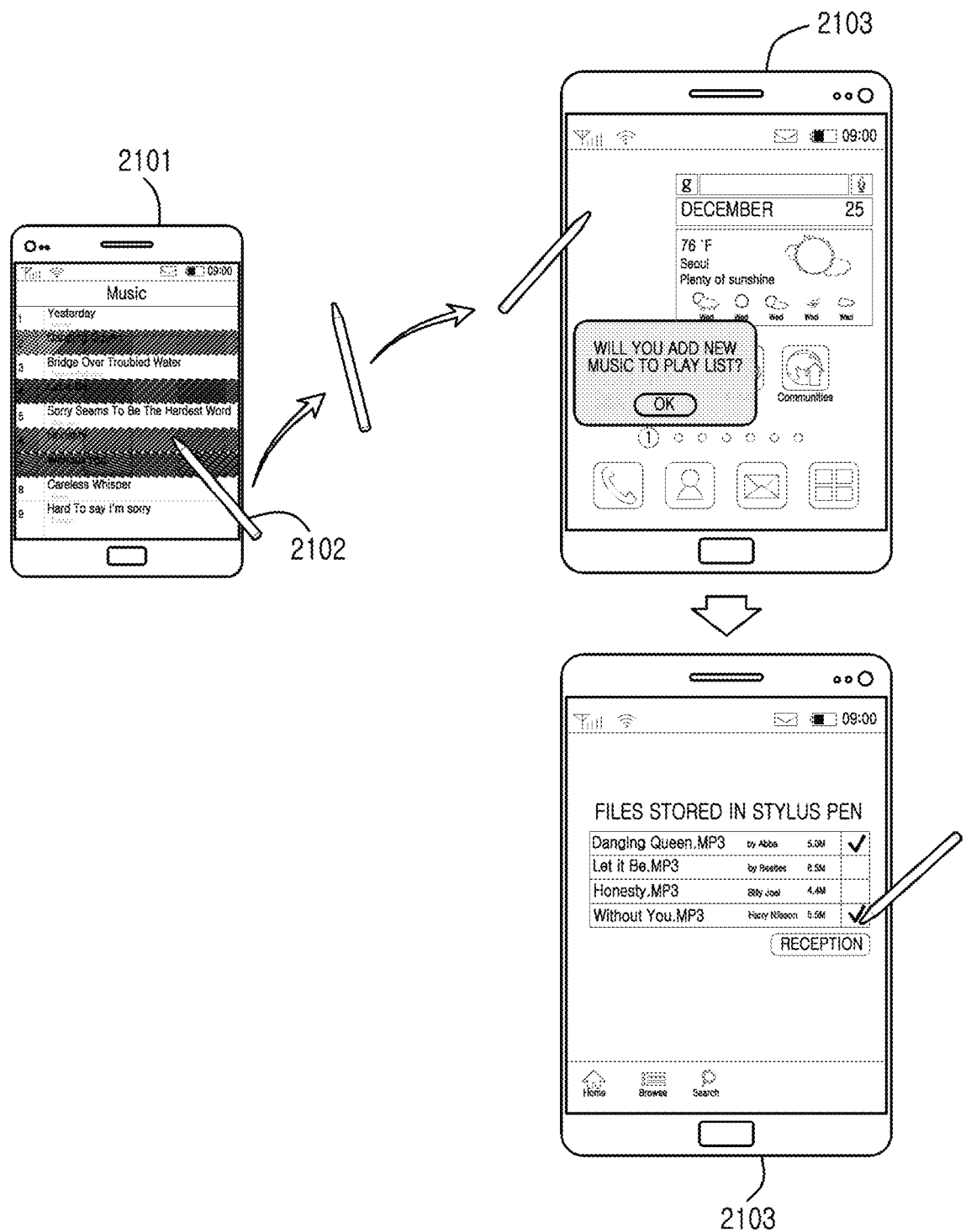

FIG. 21 illustrates a user interface screen according to an embodiment of the present disclosure.

Referring to FIG. 21, a user may select a plurality of music files from a music list displayed on a screen of a first electronic device 2101, with an electronic pen 2102. The first electronic device 2101 may transmit metadata of touched music files to the electronic pen 2102. The electronic pen 2102 may receive and/or store the metadata from the first electronic device 2101. If the user selects a screen of a second electronic device 2103 with the electronic pen 2102, the electronic pen 2102 may transmit the metadata of the plurality of music files to the second electronic device 2103. The second electronic device 2103 may process the metadata and display a list of the plurality of music files which may be received from the electronic pen 2102. The user may select a music file intended to be received among the list. The second electronic device 2103 may access the first electronic device 2101, and request the selected music file to the first electronic device 2101, and receive the music file from the first electronic device 2101.

Figure 22:
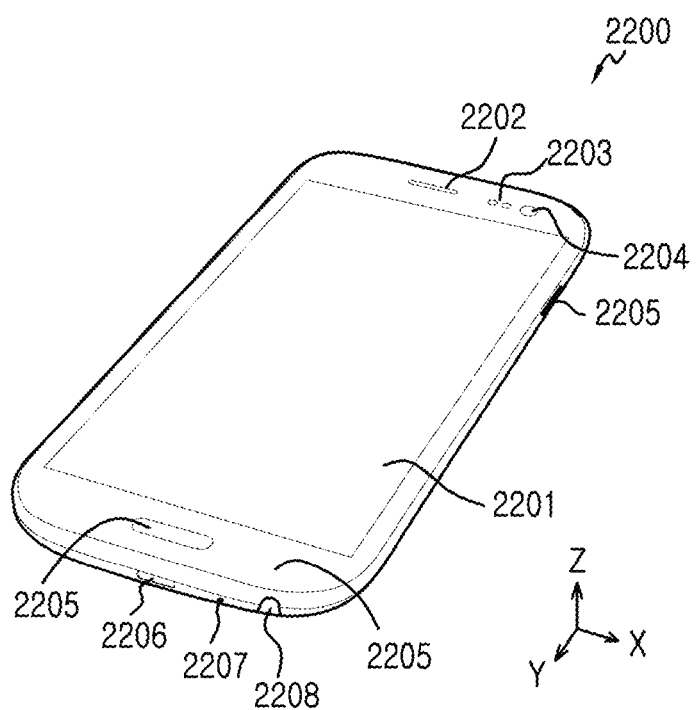
FIG. 22 illustrates an electronic device according to an embodiment of the present disclosure.

FIG. 22 illustrates an electronic device according to an embodiment of the present disclosure. The electronic device 2200 may include the electronic device 901 illustrated in FIG. 9.

Referring to FIG. 22, the electronic device 2200 may include a touch screen 2201, a speaker 2202, at least one sensor 2203, a camera 2204, at least one key 2205, an external port 2206, a microphone 2207, or an electronic pen 2208.

The external port 2206 may be used as a port for connecting with a HDMI, a USB, a projector, and a D-sub cable, or a charging port.

The electronic pen 2208 may be taken out from the electronic device 2200. The at least one sensor 2203 (e.g., a stylus detector) may sense attachment/detachment of the stylus 2208. The at least one key 2205 may include at least one hard key and at least one soft key that may be changed depending on a displayed screen or executed function.

Figure 23:
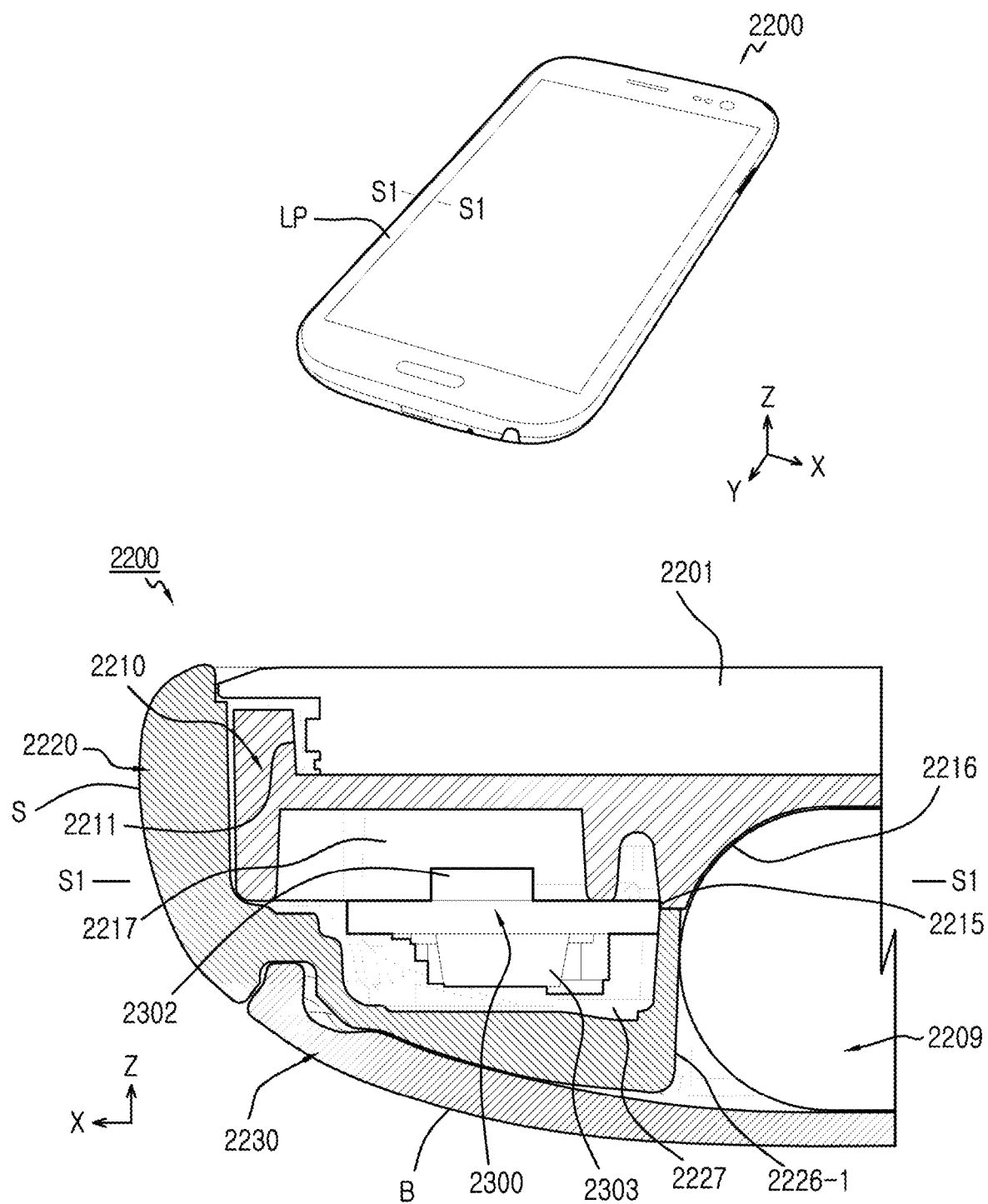
FIGS. 23 and 24 illustrate cross sections of electronic devices according to various embodiments of the present disclosure.

FIG. 23 illustrates a cross section of an electronic device according to an embodiment of the present disclosure. A portion taken along Line S1-S2 may be included in a left edge part (LP) of the electronic device 2200.

Referring to FIG. 23, the electronic device 2200 may include a touch screen 2201, a bracket 2210, a device case 2220, a battery cover 2230, or a main circuit board (i.e., a mainboard or a motherboard or a printed circuit board (PCB)) 2300.

The touch screen 2201 may include a window, a touch panel, a display panel or a digitizer panel not shown.

The bracket 2210 may include a mounting plate (i.e., an installation plate) capable of installing a plurality of electronic components. The bracket 2210 may include a frame capable of fixing and/or supporting the plurality of electronic components. The bracket 2210 may include a mounting surface for mounting an electronic component. This mounting surface may include a plane surface or a curved surface. The bracket 2210 may include a plurality of arrangement parts which may safely mount a plurality of components. For example, the bracket 2210 may include an arrangement part 2211 which may mount the touch screen 2201. Also, the bracket 2210 may include an arrangement part 2215 which may mount the main circuit board 2300. Also, the bracket 2210 may include a space 2217 which may house electronic components 2302 protruded upward from the main circuit board 2300. Also, the bracket 2210 may include a battery pack arrangement part 2216 of a concave container shape capable of housing a part of a battery pack 2209.

The device case 2220 may be coupled (e.g., snap-fit engaged or bolt engaged) to the bracket 2210. Or, in accordance with various embodiments, the device case 2220 may also exist in an integral type, not existing as a piece apart from the battery cover 2230. The device case 2220 may cover a plurality of components fixed to the bracket 2210. The device case 2220 may cover at least a portion of the main circuit board 2300 fixed to the bracket 2210. The bracket 2210, the device case 2220, and the main circuit board 2300 may be coupled together in a bolt engagement manner. The device case 2220 may include a recess 2227 capable of housing electronic components 2303 mounted on one surface of the main circuit board 2300. The device case 2220 may include a battery pack arrangement part 2226-1 capable of housing a part of the battery pack 2209. As illustrated, the battery pack arrangement part 2226-1 may be an opened form passing through between an upper part of the device case 2220 and a lower part thereof, and may communicate with the battery pack arrangement part 2216 of the bracket 2210. If the bracket 2210 and the device case 2220 are coupled with each other, the battery pack arrangement part 2216 of the bracket 2210 and the battery pack arrangement part 2226-1 of the device case 2220 may prepare a space of a container shape capable of housing the whole battery pack 2209. The battery pack arrangement part 2226-1 of the device case 2220 may be of a container form capable of housing the whole battery pack 2209 in itself. In this case, the battery pack arrangement part 2216 of the bracket 2210 may be unnecessary. Also, the battery pack arrangement part 2216 may be of a container form capable of housing the whole battery pack 2209 in itself. In this case, the battery pack arrangement part 2226-1 of the device case 2220 may be unnecessary.

The battery cover 2230 may be detached from the device case 2220. The battery cover 2230 may include a plurality of hooks not shown capable of being engaged to a plurality of hook engagement recesses of the device case 2220, at a frame of the battery cover 2230.

If the bracket 2210, the device case 2220, and the battery cover 2230 are all coupled to one another, an exposed surface of at least a part of the bracket 2210, the device case 2220, and the battery cover 2230 may form an outer surface of the electronic device 2200. For example, the device case 2220 may include a side surface (S) of the electronic device 2200. Also, the battery cover 2230 may include a bottom surface (B) of the electronic device 2200.

The main circuit board 2300 may include a board mounting a basic circuit and a plurality of electronic components. The main circuit board 2300 may set an execution environment of the electronic device 2200 and maintain information thereof and stably drive the electronic device 2200. Also, the main circuit board 2300 may make smooth data input/output exchange among all devices of the electronic device 2200. The main circuit board 2300 may be arranged between the bracket 2210 and the device case 2220. The main circuit board 2300 may be coupled to the bracket 2210 in an engagement method such as a bolt and the like.

Though not illustrated, at least one antenna may be arranged in at least one of the touch screen 2201, the bracket 2210, the device case 2220, the battery cover 2230, the main circuit board 2300 or the battery pack 2209.

Figure 24:
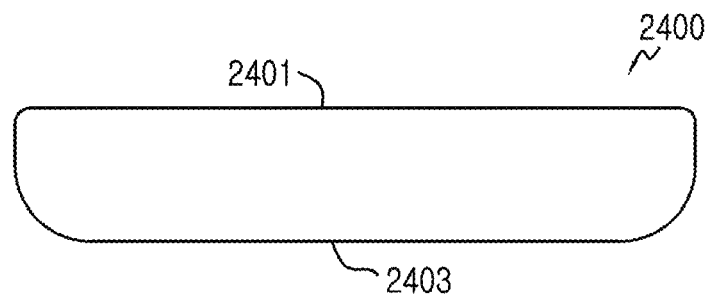

FIG. 24 illustrates a cross section of an electronic device according to an embodiment of the present disclosure. The electronic device 2400 may include the electronic device 2200 illustrated in FIG. 22.

Referring to FIG. 24, the electronic device 2400 may include at least one antenna (not shown) arranged at an upper part 2401 of the electronic device 2400 or a lower part 2403 thereof.

Figure 25:
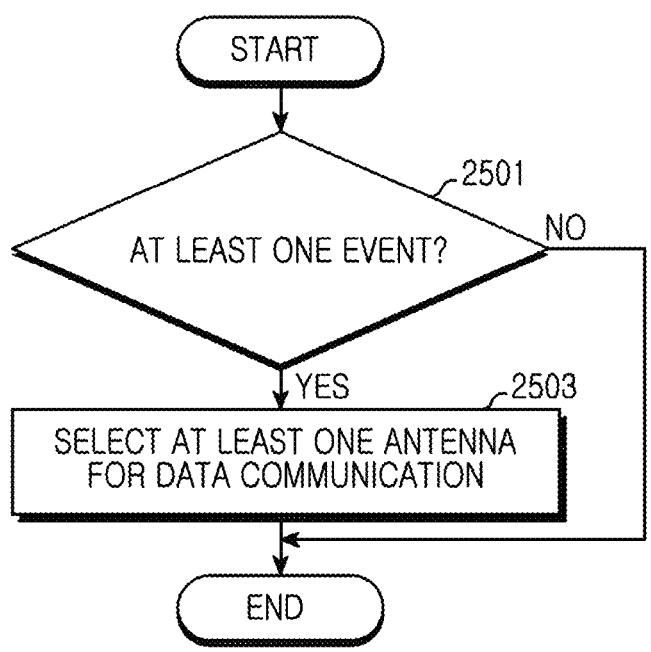
FIGS. 25 and 26 are flowcharts of operation procedures of electronic devices according to various embodiments of the present disclosure.

FIG. 25 is a flowchart of an operation procedure of an electronic device according to an embodiment of the present disclosure.

Referring to FIG. 25, in operation 2501, the user interface module 970 (e.g., the antenna switching module 1020) may determine the occurrence or non-occurrence of at least one event (e.g., electronic pen's approaching). If at least one event occurs, the user interface module 970 may select at least one antenna for data communication with an external electronic device (e.g., an electronic pen) in operation 2503.

Figure 26:
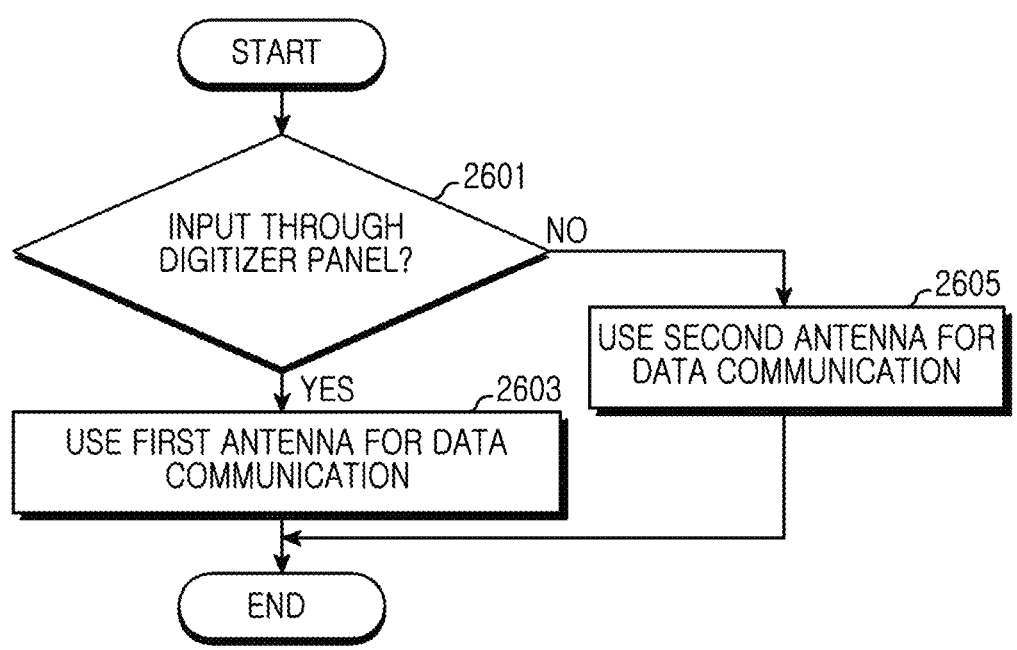

FIG. 26 illustrates a flowchart of an operation procedure of an electronic device according to an embodiment of the present disclosure.

Referring to FIG. 26, in operation 2601, the user interface module 970 (e.g., the antenna switching module 1020) may determine input or non-input through a digitizer panel. For example, if an electronic pen approaches a screen of the electronic device (2200 of FIG. 22), input (e.g., touch or hovering) may occur through the digitizer panel. If there is an input through the digitizer panel, the user interface module 970 may use a first antenna (e.g., an antenna arranged in the upper part 2401 of the electronic device 2400) for data communication with an external electronic device (e.g., an electronic pen) in operation 2603. Here, the first antenna may be set to communicate data in front of the screen.

Or, if there is no input through the digitizer panel, in operation 2605, the user interface module 970 may use a second antenna (e.g., an antenna arranged in the lower part 2403 of the electronic device 2400) for data communication with the external electronic device (e.g., the electronic pen). Here, the second antenna may be set to communicate data behind the screen.

According to an embodiment of the present disclosure, a second electronic device (e.g., an electronic device 2200 of FIG. 23) may include a screen (e.g., the touch screen 2201), and a data communication antenna (e.g., an NFC antenna) for exchanging a first wireless signal with the first electronic device (e.g., an electronic device 100 of FIG. 1) in a way of electromagnetically inducing the first electronic device (e.g., the electronic pen 100) arranged in front of the screen 2201.

According to an embodiment of the present disclosure, the second electronic device 2200 may further include a communication IC (e.g., the data communication module 1010 of FIG. 10) for processing the first wireless signal.

According to an embodiment of the present disclosure, a data communication antenna of the second electronic device 2200 may be used for at least one short-range wireless communication (e.g., NFC, BT or the like).

According to an embodiment of the present disclosure, the second electronic device 2200 may further include a coordinate sensing sensor (e.g., the digitizer panel 614 of FIG. 6) for exchanging a second wireless signal with the first electronic device 100 in a way of electromagnetically inducing the first electronic device (e.g., the electronic pen 100) arranged in front of the screen 2201.

According to an embodiment of the present disclosure, the second electronic device 2200 may further include a controller (e.g., the digitizer controller 616 of FIG. 6) for processing the second wireless signal.

According to an embodiment of the present disclosure, a data communication antenna (e.g., the first radiator 701 of FIG. 7) of the second electronic device 2200 and a coordinate sensing sensor (e.g., the second radiator 703 of FIG. 7) thereof may be arranged in the same panel, together.

According to an embodiment of the present disclosure, the data communication antenna 701 of the second electronic device 2200 may be arranged outside the coordinate sensing sensor 703.

According to an embodiment of the present disclosure, the electronic device 2200 may include a touch screen 2201, at least one antenna mounted on the touch screen 2201, and/or a communication module (e.g., the data communication module 1010) for performing data communication using the at least one antenna.

According to an embodiment of the present disclosure, at least one antenna may be mounted in at least one of at least one laminate element (e.g., the window 2211, the touch panel 2212, the display 2213, or the digitizer panel 2214) including the touch screen 2201.

According to an embodiment of the present disclosure, at least one antenna may be mounted in the digitizer panel 2214.

According to an embodiment of the present disclosure, the communication module (e.g., the data communication module 1010) may process at least one short-range wireless communication (e.g., NFC or BT).

According to an embodiment of the present disclosure, the electronic device 2200 may further include at least one antenna spaced and arranged under the touch screen 2201 and used for the communication module 1010.

According to an embodiment of the present disclosure, at least one antenna spaced and arranged under the touch screen 2201 may be arranged in at least one of the PCB 2300, the battery pack 2209 and/or the housing (e.g., the bracket 2210, the device case 2220, or the battery cover 2230).

According to an embodiment of the present disclosure, the electronic device 2200 may further include a ferrite arranged between at least one antenna mounted at the touch screen 2201 and at least one antenna spaced and arranged under the touch screen 2201.

According to an embodiment of the present disclosure, the electronic device 2200 may further include the antenna switching module 1020 for selecting an antenna used for the communication module 1010 among at least one antenna mounted on the touch screen 2201 and at least one antenna spaced and arranged under the touch screen 2201.

According to an embodiment of the present disclosure, if there is an input through the touch screen 2201, the antenna switching module 1020 may control at least one antenna mounted on the touch screen 2201 to be used for communication.

According to an embodiment of the present disclosure, the electronic device 2200 may further include a ferrite arranged between at least one antenna mounted at the touch screen 2201 and at least one antenna spaced and arranged under the touch screen 2201.

According to an embodiment of the present disclosure, an operation method of an electronic device may include the operations of obtaining connection information of a counterpart electronic device from an electronic pen, establishing communication with the counterpart electronic device using the connection information, and exchanging data with the counterpart electronic device.

According to an embodiment of the present disclosure, the operation of obtaining the connection information of the counterpart electronic device from the electronic pen obtains the connection information of the counterpart electronic device when the electronic pen approaches a touch or hovering input range of the electronic device.

According to an embodiment of the present disclosure, the operation of obtaining the connection information of the counterpart electronic device from the electronic pen may obtain the connection information of the counterpart electronic device from an NFC tag mounted at the electronic pen.

According to an embodiment of the present disclosure, the operation of exchanging the data with the counterpart electronic device may exchange data about an electronic pen related user interface function.

According to an embodiment of the present disclosure, the electronic pen related user interface function may include a movement of a display object responsive to a drag input of the electronic pen.

According to an embodiment of the present disclosure, an operation method of an electronic device may include the operations of reading information from a tag of an electronic pen of a counterpart electronic device, and executing a function of linking to the at least one information.

According to an embodiment of the present disclosure, the information may include input control or display control.

According to an embodiment of the present disclosure, the operation of executing the function of linking to the at least one information may execute an application suitable to the at least one information.

According to an embodiment of the present disclosure, the information may include access information about a counterpart electronic device.

According to an embodiment of the present disclosure, the operation of executing the function of linking to the information may include the operations of accessing a counterpart electronic device, obtaining electronic pen related user interface information from the counterpart electronic device, and controlling a user interface on the basis of the electronic pen related user interface information.

Figure 27:
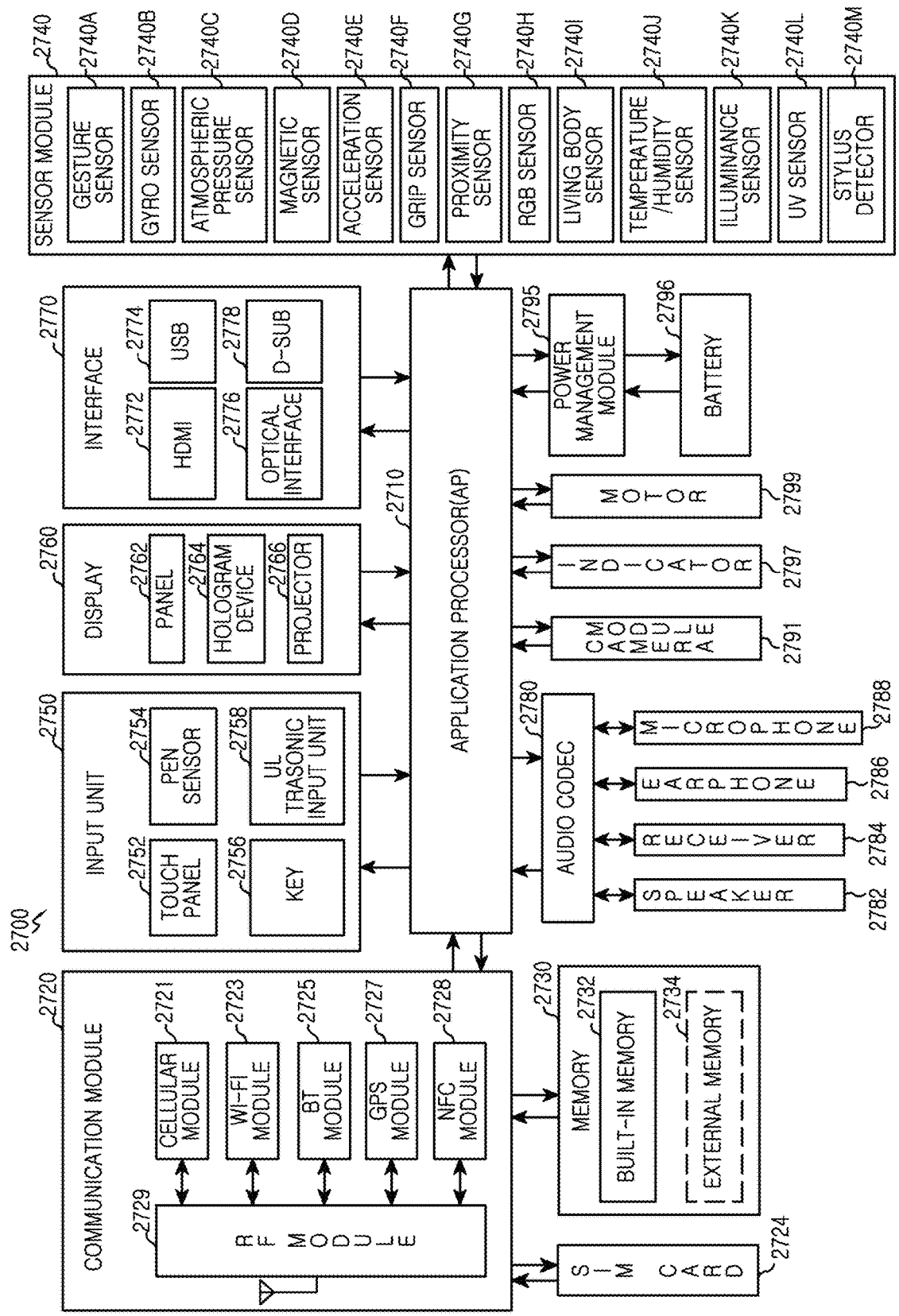
FIG. 27 illustrates a block diagram of an electronic device according to an embodiment of the present disclosure.

FIG. 27 illustrates a block diagram of an electronic device according to an embodiment of the present disclosure.

The electronic device 2700 may, for example, include the whole or part of the electronic device 101 illustrated in FIG. 1.

Referring to FIG. 27, the electronic device 2700 may include one or more Application Processors (APs) 2710, a communication module 2720, a Subscriber Identification Module (SIM) card 2724, a memory 2730, a sensor module 2740, an input device 2750, a display 2760, an interface 2770, an audio module 2780, a camera module 2791, a power management module 2795, a battery 2796, an indicator 2797, or a motor 2799.

The AP 2710 may drive an operating system or an application program and control a plurality of hardware or software constituent elements connected to the AP 2710, and perform processing and operation of various data including multimedia data. The AP 2710 may be, for example, implemented as a System On Chip (SoC). According to an embodiment, the AP 2710 may further include a Graphic Processing Unit (GPU) (not shown).

The communication module 2720 (e.g., the communication interface 170) may perform data transmission/reception in communication with and between other electronic devices (e.g., the electronic device 104 or the server 106) that are connected with the electronic device 2700 (e.g., the electronic device 101) through a network. According to an embodiment, the communication module 2720 may include a cellular module 2721, a WiFi module 2723, a BT module 2725, a GPS module 2727, an NFC module 2728, and a Radio Frequency (RF) module 2729.

The cellular module 2721 may provide voice telephony, video telephony, a text service, an interne service or the like through a telecommunication network (e.g., LTE, LTE-A, CDMA, WCDMA, UMTS, WiBro, GSM or the like). Also, the cellular module 2721 may, for example, perform electronic device distinction and authorization within the telecommunication network using a subscriber identification module (e.g., the SIM card 2724). According to an embodiment, the cellular module 2721 may perform at least some functions among functions that the AP 2710 may provide. For example, the cellular module 2721 may perform at least some of a multimedia control function.

According to an embodiment, the cellular module 2721 may include a Communication Processor (CP). Also, the cellular module 2721 may be, for example, implemented as a SoC. In FIG. 27, the constituent elements such as the cellular module 2721 (e.g., the communication processor), the memory 2730, the power management module 2795 or the like are illustrated as constituent elements apart from the AP 2710 but, according to an embodiment, the AP 2710 may be implemented to include at least some (e.g., the cellular module 2721) of the aforementioned constituent elements.

According to an embodiment, the AP 2710 or the cellular module 2721 (e.g., the communication processor) may load to a volatile memory an instruction or data received from a non-volatile memory connected to each of the AP 2710 and the cellular module 2721 or at least one of other constituent elements, and process the loaded instruction or data. Also, the AP 2710 or the cellular module 2721 may store in the non-volatile memory data received from at least one of another constituent element or generated by at least one of the other constituent elements.

The WiFi module 2723, the BT module 2725, the GPS module 2727 or the NFC module 2728 each may, for example, include a processor for processing data transmitted/received through the corresponding module. In FIG. 27, the cellular module 2721, the WiFi module 2723, the BT module 2725, the GPS module 2727 or the NFC module 2728 are illustrated as separate blocks but, according to an embodiment, at least some (e.g., two or more) of the cellular module 2721, the WiFi module 2723, the BT module 2725, the GPS module 2727 or the NFC module 2728 may be included within one IC or IC package. For example, at least some (e.g., the communication processor corresponding to the cellular module 2721 and/or the WiFi processor corresponding to the WiFi module 2723) of the processors each corresponding to the cellular module 2721, the WiFi module 2723, the BT module 2725, the GPS module 2727 or the NFC module 2728 may be implemented as one SoC.

The RF module 2729 may control transmission/reception of data, for example, transmission/reception of an RF signal. Though not illustrated, the RF module 2729 may, for example, include a transceiver, a Power Amplifier Module (PAM), a frequency filter, a Low Noise Amplifier (LNA) or the like. Also, the RF module 2729 may further include a component for transmitting/receiving an electromagnetic wave on a free space in wireless communication, for example, a conductor, a conductive wire or the like. FIG. 27 illustrates that the cellular module 2721, the WiFi module 2723, the BT module 2725, the GPS module 2727 and/or the NFC module 2728 share one RF module 2729 with each other but, according to an embodiment, at least one of the cellular module 2721, the WiFi module 2723, the BT module 2725, the GPS module 2727 or the NFC module 2728 may perform transmission/reception of an RF signal through a separate RF module.

The SIM card 2724 may be a card including a subscriber identification module, and may be inserted into a slot provided in a specific position of the electronic device 2700. The SIM card 2724 may include unique identification information (e.g., an Integrated Circuit Card ID (ICCID)) or subscriber information (e.g., an International Mobile Subscriber Identity (IMSI)).

The memory 2730 (e.g., the memory 130) may include an internal memory 2732 or an external memory 2734. The internal memory 2732 may, for example, include at least one of a volatile memory (for example, a Dynamic Random Access Memory (DRAM), a Static RAM (SRAM), a Synchronous Dynamic RAM (SDRAM) and the like) or a non-volatile memory (e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory and the like).

According to an embodiment, the internal memory 2732 may be a Solid State Drive (SSD). The external memory 2734 may further include a flash drive, for example, Compact Flash (CF), Secure Digital (SD), micro-SD, Mini-SD, extreme Digital (xD), a memory stick, or the like. The external memory 2734 may be operatively connected with the electronic device 2700 through various interfaces. According to an embodiment, the electronic device 2700 may further include a storage device (or a storage media) such as a hard drive.

The sensor module 2740 may meter a physical quantity or sense an activation state of the electronic device 2700, and convert metered or sensed information into an electric signal. The sensor module 2740 may, for example, include at least one of a gesture sensor 2740A, a gyro sensor 2740B, an air pressure sensor 2740C, a magnetic sensor 2740D, an acceleration sensor 2740E, a grip sensor 2740F, a proximity sensor 2740G, a color sensor 2740H (e.g., a Red, Green, Blue (RGB) sensor), a bio-physical sensor 2740I, a temperature/humidity sensor 2740J, an illumination sensor 2740K, a Ultraviolet (UV) sensor 2740L, or a stylus detector 2740M. Additionally or alternatively, the sensor module 2740 may, for example, include an E-nose sensor (not shown), an Electromyography (EMG) sensor (not shown), an Electroencephalogram (EEG) sensor (not shown), an Electrocardiogram (ECG) sensor (not shown), an Infrared (IR) sensor (not shown), an iris sensor (not shown), a fingerprint sensor (not shown) or the like. The sensor module 2740 may further include a control circuit for controlling at least one or more sensors belonging to therein.

The input device 2750 may include a touch panel 2752, a (digital) pen sensor 2754, a key 2756, or an ultrasonic input device 2758. The touch panel 2752 may, for example, recognize a touch input in at least one of a capacitive overlay method, a pressure sensitive method, an infrared beam method, or an acoustic wave method. Also, the touch panel 2752 may also further include a control circuit. In a case of the capacitive overlay method, physical contact or proximity recognition is possible. The touch panel 2752 may also further include a tactile layer. In this case, the touch panel 2752 may provide a tactile response to a user.

The (digital) pen sensor 2754 may be implemented in the same or similar method to receiving a user's touch input or using a separate sheet for recognition. The key 2756 may, for example, include a physical button, an optical key, or a keypad. The ultrasonic input device 2758 is a device capable of identifying data by sensing a sound wave with a microphone 2788 in the electronic device 2700 through an input tool generating an ultrasonic signal, and enables wireless recognition. According to an embodiment, the electronic device 2700 may also receive a user input from an external device (e.g., a computer or a server) connected with the electronic device 2700 through the communication module 2720.

The display 2760 (e.g., the output device 150) may include a panel 2762, a hologram device 2764, and/or a projector 2766. The panel 2762 may, for example, be a Liquid Crystal Display (LCD), an Active-Matrix Organic Light-Emitting Diode (AMOLED) or the like. The panel 2762 may be implemented to be flexible, transparent, or wearable. The panel 2762 may be also constructed as one module with the touch panel 2752. The hologram device 2764 may show a three-dimensional image in the air using interference of light. The projector 2766 may project light to a screen and display an image. The screen may be, for example, located inside or outside the electronic device 2700. According to an embodiment, the display 2760 may further include a control circuit for controlling the panel 2762, the hologram device 2764, or the projector 2766.

The interface 2770 may, for example, include an HDMI 2772, a USB 2774, an optical interface 2776, or a D-sub-miniature (D-sub) 2778. The interface 2770 may be, for example, included in the communication interface 170 illustrated in FIG. 1. Additionally or alternatively, the interface 2770 may, for example, include a Mobile High-Definition Link (MHL) interface, a Secure Digital card/Multi Media Card (SD/MMC) interface or an Infrared Data Association (IrDA) standard interface.

The audio module 2780 may convert a voice and an electric signal interactively. At least some constituent elements of the audio module 2780 may be, for example, included in the input/output interface 140 illustrated in FIG. 1. The audio module 2780 may, for example, process sound information inputted or outputted through a speaker 2782, a receiver 2784, an earphone 2786, the microphone 2788 or the like.

The camera module 2791 is a device able to take a still picture and a moving picture. According to an embodiment, the camera module 2791 may include one or more image sensors (e.g., a front lens or rear lens), a lens (not shown), an Image Signal Processor (ISP) (not shown), and/or a flash (not shown) (e.g., an LED or a xenon lamp).

The power management module 2795 may manage electric power of the electronic device 2700. Though not illustrated, the power management module 2795 may, for example, include a Power Management Integrated Circuit (PMIC), a charger IC, or a battery or fuel gauge.

The PMIC may be, for example, mounted within an integrated circuit or a SoC semiconductor. A charging method may be divided into a wired charging method and a wireless charging method. The charger IC may charge the battery 2796, and may prevent the introduction of overvoltage or overcurrent from an electric charger. According to an embodiment, the charger IC may include a charger IC for at least one of the wired charging method or the wireless charging method. The wireless charging method may, for example, be a magnetic resonance method, a magnetic induction method, an electromagnetic wave method, or the like. A supplementary circuit for wireless charging, for example, a circuit such as a coil loop, a resonance circuit, a rectifier or the like may be added.

The battery or fuel gauge may, for example, measure a level of the battery 2796, a charging voltage thereof, a charging current thereof, or a charging temperature thereof. The battery 2796 may generate or store electricity, and supply power to the electronic device 2700 using the stored or generated electricity. The battery 2796 may, for example, include a rechargeable battery or a solar battery.

The indicator 2797 may display a specific status of the electronic device 2700 or a part (e.g., the AP 2710) thereof, for example a booting state, a message state, a charging state or the like. The motor 2799 may convert an electric signal into a mechanical vibration. Though not illustrated, the electronic device 2700 may include a processing device (e.g., a GPU) for mobile TV support. The processing device for mobile TV support may, for example, process media data according to the standards of Digital Multimedia Broadcasting (DMB), Digital Video Broadcasting (DVB), a media flow or the like.

Each of the aforementioned constituent elements of the electronic device according to the present disclosure may include one or more components, and a name of the corresponding constituent element may be different in accordance to the kind of electronic device. An electronic device according to the present disclosure may include at least one of the aforementioned constituent elements, and may omit some constituent elements or further include additional other constituent elements. Also, some of the constituent elements of the electronic device according to the present disclosure are combined to form one entity, thereby identically performing the functions of the corresponding constituent elements before combination.

Figure 28:
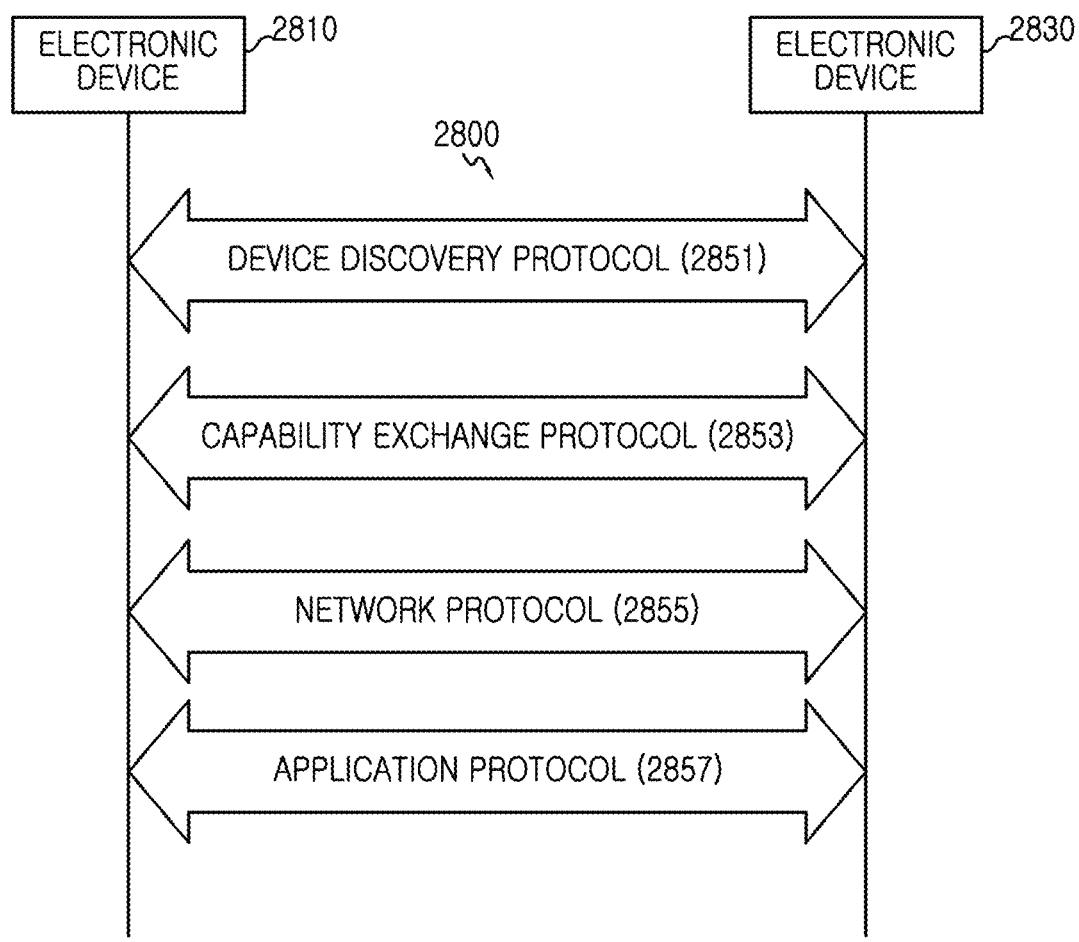
FIG. 28 illustrates a communication protocol among a plurality of electronic devices according to an embodiment of the present disclosure.

FIG. 28 illustrates a communication protocol among a plurality of electronic devices according to an embodiment of the present disclosure.

Referring to FIG. 28, for example, a communication protocol 2800 may include a device discovery protocol 2851, a capability exchange protocol 2853, a network protocol 2855, an application protocol 2857 and/or the like.

According to an embodiment, the device discovery protocol 2851 may be a protocol for allowing electronic devices (e.g., the electronic device 2810 or the electronic device 2830) to sense an external electronic device capable of communicating with itself or connect with the sensed external electronic device. For example, the electronic device 2810 (e.g., the electronic device 901) is a device capable of communicating with the electronic device 2810 through a communication method (e.g., WiFi, BT, USB or the like) usable in the electronic device 2810, using the device discovery protocol 2851. The electronic device 2810 may sense the electronic device 2830 (e.g., the electronic device 904). The electronic device 2810 may acquire and store sensed identification information about the electronic device 2830 with the device discovery protocol 2851, for the sake of communication connection with the electronic device 2830. The electronic device 2810 may, for example, establish communication connection with the electronic device 2830, based on at least identification information.

According to various embodiments, the device discovery protocol 2851 may be a protocol for mutual authentication between a plurality of electronic devices. For example, the electronic device 2810 may perform authentication between the electronic device 2810 and the electronic device 2830, based on communication information (e.g., a Media Access Control (MAC) address, a Universally Unique IDentifier (UUID), a SubSystem IDentification (SSID), and an Information Provider (IP) address) for connection with at least the electronic device 2830.

According to an embodiment, the capability (e.g., function) exchange protocol 2853 may be a protocol for exchanging information related with a function of a service supportable in at least one of the electronic device 2810 or the electronic device 2830. For example, the electronic devices 2810 and 2830 may exchange the information related with the function of the service that each is currently providing, through the function exchange protocol 2853. The exchangeable information may include identification information indicating a specific service among a plurality of services supportable in the electronic devices 2810 and 2830. For example, the electronic device 2810 may receive identification information of a specific service provided by the electronic device 2830, from the electronic device 2830, through the function exchange protocol 2853. In this case, the first electronic device 2810 may determine if the electronic device 2810 may support a specific service, based on the received identification information.

According to an embodiment, the network protocol 2855 may be a protocol for, for example, controlling a data flow transmitted/received to provide a service in association between the electronic devices (e.g., the electronic device 2810 and the electronic device 2830) connected to enable communication. For example, at least one of the electronic device 2810 or the electronic device 2830 may perform error control, data quality control or the like with the network protocol 2855. Additionally or alternatively, the network protocol 2855 may decide a transmission format of data transmitted/received between the electronic device 2810 and the electronic device 2830. Also, at least one of the electronic device 2810 or the electronic device 2830 may manage (e.g., session connect or session end) at least a session for mutual data exchange with the network protocol 2855.

According to an embodiment, the application protocol 2857 may be a protocol for providing a procedure or information for exchanging data related to a service provided to an external electronic device. For example, the electronic device 2810 (e.g., the electronic device 901) may provide a service to the electronic device 2830 (e.g., the electronic device 904 or the server 906) through the application protocol 2857.

According to an embodiment, the communication protocol 2800 may include a standard communication protocol, a communication protocol (e.g., a communication protocol designated by a communication device manufacturing company, a network supplying company or the like itself) designated by an individual or a group, or a combination of them.

The term "module" used in the present disclosure may, for example, represent a unit including one of hardware, software, and firmware or a combination of two or more of them. The "module" may be, for example, used interchangeably with the terms "unit", "logic", "logical block", "component", "circuit" or the like. The "module" may be also the minimum unit of an integrally constructed component or a part thereof. The "module" may also be the minimum unit performing one or more functions or a part thereof. The "module" may be implemented mechanically or electronically. For example, the "module" according to the present disclosure may include at least one of an Application-Specific Integrated Circuit (ASIC) chip, Field-Programmable Gate Arrays (FPGAs) or a programmable logic device performing some operations, well known to the art or to be developed in the future.

According to various embodiments, at least part of an apparatus (e.g., modules or functions thereof) or method (e.g., operations) according to the present disclosure may be, for example, implemented by an instruction stored in a computer-readable storage media in a form of a programming module. In a case where the instruction is executed by one or more processors (e.g., the processor 120), the one or more processors may perform functions corresponding to the instructions. The computer-readable storage media may be, for example, the memory 130. At least part of the programming module may be, for example, implemented (e.g., executed) by the processor 120. At least part of the programming module may include, for example, modules, programs, routines, sets of instructions, processes and/or the like for performing one or more functions.

The computer-readable recording media may include a magnetic media such as a hard disk, a floppy disk, and a magnetic tape, an optical media such as a Compact Disc-Read Only Memory (CD-ROM) and a Digital Versatile Disc (DVD), a Magneto-Optical Media such as a floptical disk, and a hardware device configured to store and perform a program instruction (e.g., the programming module) such as a ROM, a RAM, a flash memory and the like. Also, the program instruction may include not only a mechanical code such as a code made by a compiler but also a high-level language code executable by a computer using an interpreter and the like. The aforementioned hardware device may be configured to operate as one or more software modules in order to perform an operation of the present disclosure, and vice versa.

The module or the programming module according to various embodiments of the present disclosure may include at least one or more of the aforementioned constituent elements, or omit some of the aforementioned constituent elements, or include additional other constituent elements. Operations carried out by the module, the programming module or the other constituent elements according to various embodiments of the present disclosure may be executed in a sequential, parallel, repeated or heuristic method. Also, some operations may be executed in different order or may be omitted, or other operations may be added.

According to various embodiments of the present disclosure, a storage media storing instructions is provided. The instructions set at least one processor to perform at least one operation when the instructions are executed by the at least one processor. In an operation method of an electronic device, the at least one operation may include the operations of reading at least one information from a tag of an electronic pen of a counterpart electronic device, and executing a function of linking to the at least one information.

An electronic device may exchange data using wireless communication with an electromagnetic inductive electronic pen.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic pen comprising:
a housing;
a tip exposed through a portion of the housing;
a first antenna part disposed in the housing;
a second antenna part disposed in the housing; and
a communication integrated circuit (IC),
wherein the first antenna part generates a first current through electromagnetic induction, induced by a first coordinate sensing sensor of a first electronic device, when the electronic pen is positioned within a first input range of the first external electronic device,
wherein the second antenna part generates a second current through electromagnetic induction, induced by an antenna of the first external electronic device, when the electronic pen is positioned within a second input range of the first external electronic device,
wherein the electronic pen receives connection information of the first external electronic device when the electronic pen approaches the first or the second input range of the first external electronic device,
wherein the second external electronic device reads the connection information of the first external electronic device when the electronic pen is within a first or a second input range of the second external electronic device,
wherein the second external electronic device establishes communication with the first electronic device using the connection information,
wherein the electronic pen receives and stores metadata based on a selection of a plurality of files from a list displayed on the first electronic device,
wherein the electronic pen transmits the metadata to the second electronic device when the user selects a screen of the second electronic device, causing the second electronic device to process the metadata stored on the electronic pen and display a list of the plurality of files to be received from the electronic pen, and
wherein the second electronic device accesses, requests, and receives, from the first electronic device, files selected from the list of the plurality of files displayed on the second electronic device.

2. The electronic pen of claim 1, further comprising: a circuit for controlling the first antenna part such that a frequency of the first current is changed.

3. The electronic pen of claim 2, wherein the circuit comprises a variable impedance element.

4. The electronic pen of claim 1, wherein the second antenna part comprises at least one short-range antenna.

5. The electronic pen of claim 1, wherein the second antenna part comprises a radiator having an outer diameter greater than that of the first antenna part.

6. The electronic pen of claim 1, wherein the plurality of files are music files.

7. The electronic pen of claim 6, wherein the list displayed on the first electronic device is a music list.

* * * * *